US012583781B2

(12) United States Patent     (10) Patent No.:   US 12,583,781 B2

Ikai et al.     (45) Date of Patent:    Mar. 24, 2026

(54) GLASS FILM PRODUCTION METHOD, GLASS ROLL PRODUCTION METHOD, AND GLASS FILM PRODUCTION DEVICE

(71) Applicant: Nippon Electric Glass Co., Ltd., Shiga (JP)

(72) Inventors: Naohiro Ikai, Shiga (JP); Kenichi Murata, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 375 days.

(21) Appl. No.: 17/785,616

(22) PCT Filed: Dec. 2, 2020

(86) PCT No.: PCT/JP2020/044884
§ 371 (c)(1),
(2) Date: Jun. 15, 2022

(87) PCT Pub. No.: WO2021/131559
PCT Pub. Date: Jul. 1, 2021

(65) Prior Publication Data
US 2023/0026145 A1    Jan. 26, 2023

(30) Foreign Application Priority Data

Dec. 24, 2019    (JP) ................................. 2019-232569

(51) Int. Cl.
   *C03B 35/20*        (2006.01)
   *B28D 7/04*         (2006.01)
   (Continued)

(52) U.S. Cl.
   CPC ............ *C03B 33/091* (2013.01); *B28D 7/046* (2013.01); *B65H 20/10* (2013.01); *B65H 20/14* (2013.01);
   (Continued)

(58) Field of Classification Search
   CPC ..... C03B 33/033; C03B 33/102; C03B 35/16; C03B 33/03; C03B 17/068; C03B 35/202;
       (Continued)

(56) References Cited

U.S. PATENT DOCUMENTS 5,871,134 A * 2/1999 Komagata ............. C03B 33/033
                                      225/2
2007/0214925 A1 * 9/2007 Nishio ................. B28D 5/0011
                                      83/559

(Continued)

FOREIGN PATENT DOCUMENTS

CN       110573465      12/2019
JP       2012-240883      12/2012

(Continued)

OTHER PUBLICATIONS

International Preliminary Report on Patentability and Written Opinion of the International Searching Authority issued Jun. 28, 2022 in International (PCT) Application No. PCT/JP2020/044884.

(Continued)

*Primary Examiner* — Alison L Hindenlang
*Assistant Examiner* — Steven S Lee
(74) *Attorney, Agent, or Firm* — WENDEROTH, LIND & PONACK, L.L.P.

(57)          ABSTRACT

A manufacturing method for a glass film includes at least a cutting step of cutting a strip-shaped glass film while conveying the glass film in a predetermined direction by a conveying device. In the cutting step, the glass film is cut in predetermined cutting zones by irradiating the glass film with laser beams. A support conveyance surface of the conveying device for the glass film is separated at the cutting zones for the glass film. Further, a first surface plate capable of supporting the glass film in a contact manner is disposed at a position that is located in a width direction of the glass (Continued)

film with respect to the cutting zones and corresponds to a center of a glass film obtained by the cutting in the width direction.

13 Claims, 8 Drawing Sheets

(51) Int. Cl.

| | |
|---|---|
| *B65H 20/10* | (2006.01) |
| *B65H 20/14* | (2006.01) |
| *C03B 17/06* | (2006.01) |
| *C03B 33/023* | (2006.01) |
| *C03B 33/03* | (2006.01) |
| *C03B 33/09* | (2006.01) |

(52) U.S. Cl.
CPC .......... *C03B 17/068* (2013.01); *C03B 35/202* (2013.01); *B65G 2249/045* (2013.01); *C03B 33/0235* (2013.01); *C03B 33/03* (2013.01)

(58) Field of Classification Search
CPC .... C03B 33/091; B23K 26/402; B28D 1/221; B28D 7/046; B65H 20/10; B65H 20/06; B23D 7/046
See application file for complete search history.

(56) References Cited

U.S. PATENT DOCUMENTS

| | | | | |
|---|---|---|---|---|
| 2007/0228630 | A1* | 10/2007 | Grundmuller | ......... B23K 26/10 269/71 |
| 2009/0050661 | A1* | 2/2009 | Na | ......... B26F 3/002 225/2 |
| 2012/0017642 | A1* | 1/2012 | Teranishi | ......... B32B 17/10 65/273 |
| 2012/0318024 | A1* | 12/2012 | Mori | ......... B65G 49/06 65/193 |
| 2013/0291593 | A1* | 11/2013 | Roh | ......... C03B 33/037 65/158 |
| 2014/0017475 | A1* | 1/2014 | Teranishi | ......... C03B 33/0215 83/16 |
| 2014/0054348 | A1* | 2/2014 | Teranishi | ......... C03B 33/091 225/2 |
| 2014/0130649 | A1* | 5/2014 | Chang | ......... C03B 33/033 83/26 |
| 2015/0315059 | A1* | 11/2015 | Abramov | ......... C03B 23/0235 65/176 |
| 2016/0168003 | A1* | 6/2016 | Hasegawa | ......... C03B 33/0235 65/184 |
| 2018/0044216 | A1* | 2/2018 | Hasegawa | ......... C03B 23/02 |
| 2019/0161385 | A1 | 5/2019 | Mitsugi et al. | |
| 2020/0079679 | A1 | 3/2020 | Mori et al. | |
| 2020/0361807 | A1 | 11/2020 | Ikai et al. | |

FOREIGN PATENT DOCUMENTS

| | | | | |
|---|---|---|---|---|
| JP | 2015057366 | A * | 3/2015 | |
| JP | 2015-63450 | | 4/2015 | |
| JP | 2019048734 | A * | 3/2019 | ......... C03B 33/0235 |
| WO | WO-2009084489 | A1 * | 7/2009 | ......... B23K 26/0853 |
| WO | WO-2013031908 | A1 * | 3/2013 | ......... C03B 33/033 |
| WO | 2015/029888 | | 3/2015 | |
| WO | 2017/208677 | | 12/2017 | |
| WO | WO-2017208677 | A1 * | 12/2017 | ......... B23K 26/38 |
| WO | 2018/168380 | | 9/2018 | |
| WO | WO-2018168380 | A1 * | 9/2018 | ......... C03B 33/091 |
| WO | 2019/049646 | | 3/2019 | |

OTHER PUBLICATIONS

International Search Report issued Feb. 16, 2021 in corresponding International Application No. PCT/JP2020/044884.
First Office Action dated Mar. 19, 2024, in corresponding Chinese Patent Application No. 202080079232.4 with English-language translation.
Notice of Reasons for Refusal issued Aug. 23, 2024 in corresponding Japanese Patent Application No. 2021-567126, with English-language Translation.
Office Action issued Jan. 1, 2025 in corresponding Chinese Patent Application No. 202080079232.4, with English-language translation.
Wang Chengyu et al., "Glass Surface Decoration", National Defense Industry Press, 2nd edition, Jan. 2011, cited in CA.

* cited by examiner

FIG. 3

GLASS FILM PRODUCTION METHOD, GLASS ROLL PRODUCTION METHOD, AND GLASS FILM PRODUCTION DEVICE

TECHNICAL FIELD

The present invention relates to a manufacturing method for a glass film, a manufacturing method for a glass roll, and a manufacturing apparatus for a glass film, more particularly, to a technology for cutting a strip-shaped glass film.

BACKGROUND ART

As is well known, thinning of glass sheets to be used in flat panel displays (FPD), such as a liquid crystal display and an OLED display, glass sheets to be used in OLED illumination, glass sheets to be used for manufacturing a tempered glass that is a component of a touch panel, and the like, and glass sheets to be used in panels of solar cells, and the like has been promoted in the current circumstances.

For example, in Patent Literature 1, there is disclosed a glass film having a thickness of several hundred micrometers or less. As described also in this literature, this kind of glass sheet is generally formed continuously with a forming device employing a so-called overflow down-draw method.

In this case, an elongated glass film formed continuously by the overflow down-draw method is changed in its conveying direction from a vertical direction to a horizontal direction, and is then continuously conveyed to a downstream side with a lateral conveying unit (horizontal conveying unit) of a conveying device. In the process of the conveyance, both end portions (thick portions) of the glass film in a width direction are cut and removed. After that, the glass film is rolled up into a roll shape with a roll-up roller. Thus, a glass roll is obtained.

In Patent Literature 1, as a method of cutting the glass film, a cutting method using a laser beam is disclosed. This cutting method is a so-called laser cleavage method and involves, while conveying the glass film in a longitudinal direction thereof, forming initial cracks on the glass film by crack forming means, such as a diamond cutter, and then irradiating the portion with a laser beam to heat the portion, followed by cooling the heated portion by cooling means. With this, a thermal stress is generated in the glass film, and the initial cracks are developed through the thermal stress, to thereby cut the glass film.

When an ultra-thin glass film having a thickness of 200 μm or less is cut by the above-mentioned method while conveyed, innumerable wrinkles may occur on the glass film during its conveyance. When the glass film is cut under the state in which the wrinkles overlap with its irradiation position with a laser beam, there is a problem in that a defect remains on an end surface of the glass film formed thorough the cutting after the cutting owing to the wrinkles.

In view of this, in Patent Literature 2, there is proposed a manufacturing method for a glass film, including a cutting step of cutting a strip-shaped glass film conveyed in a predetermined conveying direction through irradiation of the glass film with a laser beam, wherein the cutting step includes a step of, while supporting a lower surface of the glass film by a surface plate including an opening and sucking the glass film through the opening, irradiating the glass film with the laser beam. With such configuration, the following effect is expected. Part of the strip-shaped glass film conveyed along the conveying direction is sucked through the opening of the surface plate, and hence the occurrence of wrinkles on the sucked part can be prevented, or wrinkles having occurred on the glass film can be eliminated. Thus, when the sucked part of the glass film is irradiated with the laser beam, to thereby cut the glass film, the occurrence of a defect on a cut surface can be prevented.

CITATION LIST

Patent Literature

Patent Literature 1: JP 2012-240883 A
Patent Literature 2: WO 2019/049646 A1

SUMMARY OF INVENTION

Technical Problem

Meanwhile, as described in Patent Literature 1 and Patent Literature 2, when a strip-shaped glass film is cut by irradiation with a laser beam while being conveyed in a predetermined direction, the glass film is conveyed in the predetermined direction in a state of being supported on a belt conveyor in a contact manner. In addition, a laser-beam irradiation area, specifically, a cutting zone for a glass film is set on a conveyance path (also referred to as "path line") of the conveying device described above. Thus, when the glass film passes through the cutting zone, the part of the glass film that passes through the cutting zone is conveyed while being supported on its lower side by a support member such as a belt in a contact manner. In such a case, for example, vibration or vertical movement of the belt is transmitted to the area of the glass film, which is irradiated with the laser beam, and hence stable cutting is difficult to perform. Further, it is difficult to completely suppress the vertical movement of the belt in terms of a structure. An irradiation position with a laser beam is changed by the vertical movement, and hence stable cutting is difficult to perform. This problem may similarly occur, as described in Patent Literature 2, when the glass film is cut by the irradiation with a laser beam while an area of the glass film in close vicinity of the laser-beam irradiation area is being sucked.

In view of the circumstances described above, a technical object to be achieved by the present invention is to stably provide a high-quality glass film by preventing an influence of driving of a conveying device on laser cutting of the glass film so as to stably cut a glass film.

Solution to Problem

The above-mentioned object is achieved by a manufacturing method for a glass film according to the present invention. That is, there is provided a manufacturing method for a glass film, the manufacturing method comprising at least a cutting step of cutting a strip-shaped glass film while conveying the glass film in a predetermined direction by a conveying device, wherein, in the cutting step, the glass film is cut in predetermined cutting zones by irradiating the glass film with laser beams, wherein a support conveyance surface of the conveying device for the glass film is separated at the cutting zones for the glass film so that the conveying device is separated into an upstream-side conveyor located on an upstream side of the cutting zones in a conveying direction for the glass film and a downstream-side conveyor located on a downstream side of the cutting zones in the conveying direction, and wherein a first surface plate capable of supporting the glass film in a contact manner is disposed at a position that is located in a width direction of the glass film with respect to the cutting zones and corresponds to a center of a glass film obtained by the cutting in the width direction.

In Description, the width direction of the glass film refers to a direction orthogonal to a longitudinal direction and a thickness direction of the glass film.

As described above, with the manufacturing method for a glass film according to the present invention, the support conveyance surface of the conveying device for the glass film is separated at the cutting zones for the glass film so that the conveying device is separated into the upstream-side conveyor located on the upstream side of the cutting zones in the conveying direction for the glass film and the downstream-side conveyor located on the downstream side of the cutting zones in the conveying direction. Thus, the part of the glass film passing through the cutting zones is prevented from being directly subjected to vibration or vertical movement from portions driven for support and conveyance, such as belts. Thus, an influence of, for example, the vibration on the cutting can be eliminated as much as possible, thereby being capable of achieving stable laser cutting. Further, in the present invention, the first surface plate capable of supporting the glass film obtained by the cutting in a contact manner at the center of the glass film in the width direction is provided at the same position as those of the cutting zones in the conveying direction. Thus, even in regions (cutting zones) where the support conveyance surface of the conveying device is absent, the glass film being cut or the glass film obtained by cutting can be smoothly conveyed. As a result, the glass film can be cut in a stable state, and the glass film obtained by the cutting can be rolled up without causing misalignment. Accordingly, a high-quality glass film and a high-quality glass roll can be stably obtained.

Further, in the manufacturing method for a glass film according to the present invention, the first surface plate may comprise a first support surface capable of supporting the glass film in a contact manner and a first suction portion capable of sucking the glass film toward the first support surface.

When the glass film obtained by the cutting is rolled up into the glass roll on the downstream side in the conveying direction for the glass film, a tensile force generated along with roll-up acts on the glass film being cut or the glass film obtained by the cutting. Thus, when the support conveyance surface of the conveying device is separated at the cutting zones as in the present invention, not a restraining force of the support conveyance surface but only a tensile force generated along with roll-up acts on the part of the glass film passing through the cutting zones. Thus, the glass film may move as a whole, and may be misaligned from a predetermined position. Meanwhile, in the present invention, the first surface plate, which is capable of supporting the glass film passing through the cutting zones in a contact manner, includes the first suction portion capable of sucking the glass film toward the first support surface. This configuration allows the glass film being cut or the glass film obtained by cutting to be subjected to a suction force toward the first support surface in its center in the width direction. Thus, the suction force can act as a force, which counteracts the tensile force generated along with the roll-up, on the part of the glass film passing through the cutting zones. As a result, misalignment of the glass film can be reduced. Thus, the glass film can be precisely cut to obtain a high-quality glass film and a high-quality glass roll.

Further, in the case of providing the first suction portion as described above, in the manufacturing method for a glass film according to the present invention, the first suction portion may have a first air intake port having a groove shape, which is open on the first support surface and extends along the conveying direction.

When the first suction portion has the configuration as described above, the suction force can be uniformly applied to the glass film in the longitudinal direction. Thus, a sufficient force counteracting the tensile force generated along with the roll-up described above can be applied to the glass film while movement of the glass film caused by the suction is prevented.

Further, in the case of providing the first air intake port as described above, in the manufacturing method for a glass film according to the present invention, the first air intake port may have open ends on both sides in a longitudinal direction.

When the first air intake port having a groove shape has open ends on both sides in the longitudinal direction as described above, the suction is performed by the first air intake port through its opening on the first support surface and both open ends in the longitudinal direction. Thus, even under a state in which the opening on the first support surface is closed by the glass film, outside air can be still sucked through both open ends in the longitudinal direction. The suction through the first suction portion is performed while the glass film is being conveyed in a predetermined direction. Thus, if the air intake port is fully closed by the glass film, even a small leak may greatly fluctuate the suction force, making the position of the glass film unstable. Thus, when the suction (air intake) is additionally performed through both ends of the first air intake port having a groove shape in the longitudinal direction as described above, a fluctuation in suction force can be reduced while the suction force is adjusted to an appropriate magnitude.

Further, in the manufacturing method for a glass film according to the present invention, a second surface plate having a second support surface capable of supporting the glass film in a contact manner may be disposed so as to include each of the cutting zones. In this case, the second surface plate may have a second suction portion capable of sucking the glass film toward the second support surface.

When the second surface plates are provided as described above, the glass film can be cut at precise positions even in the cutting zones where the support conveyance surface of the conveying device is absent. Further, in this case, when each of the second surface plates has the second suction portion having the above-mentioned configuration, the glass film can be cut in a state of being restrained (positioned) at predetermined positions on the second support surfaces. Thus, more appropriate and stable laser cutting can be performed. Further, the suction of the glass film toward the second support surfaces can eliminate wrinkles formed in sucked portions of the glass film or prevent the formation of wrinkles. Thus, the above-mentioned configuration provides a high-cutting-quality glass film.

Further, in the case of providing the second suction portion as described above, in the manufacturing method for a glass film according to the present invention, the second suction portion may have a second air intake port being open on the second support surface and a pair of third air intake ports located on both sides of the second air intake port in the width direction.

As described above, when the pair of third air intake ports are formed in addition to the second air intake port, the glass film can be uniformly and effectively restrained in the width direction (restrained through local deformation caused by suction). As a result, vertical movement of the glass film in a state of being conveyed can be suppressed to thereby achieve stable laser cutting.

Further, in the case of providing the second suction portion as described above, in the manufacturing method for a glass film according to the present invention, suction forces of the suction portions may be adjusted so that a suction force of the first suction portion for the glass film becomes smaller than a suction force of the second suction portion for the glass film.

When the suction forces of the suction portions are adjusted as described above, the laser-cutting areas of the glass film can be relatively firmly restrained through the deformation caused along with the suction. Further, a sufficient restraining force, which counteracts the tension caused along with the roll-up on the downstream side, can be applied to a part of the glass film, which is separate in the width direction from the area being subjected to laser cutting, while smooth conveyance of the whole glass film is ensured.

Further, in the manufacturing method for a glass film according to the present invention, all contact support surfaces for the glass film, which are located in the width direction with respect to the cutting zones, may be in a stationary state. The contact support surface mentioned here includes a contact support surface (first support surface) of the first surface plate. Further, when the second surface plate is disposed, a contact support surface (second support surface) of the second surface plate is also included in the contact support surface. Meanwhile, the support conveyance surfaces of support members, such as belts, included in the conveying device are not included in the contact support surface because the belts function as driving portions of the conveying device.

With the manufacturing method according to the present invention, the support conveyance surface of the conveying device is separated at the cutting zones. Thus, the support members that drive, for example, the belts are eliminated from positions in the width direction with respect to the cutting zones. In addition, as described above, when all the contact support surfaces such as the first support surfaces are in a stationary state, a dynamic influence such as that of vibration caused by the presence of the driving portions on the part of the glass film passing through the cutting zones is prevented. Thus, the laser cutting is performed on the glass film in more stable position and posture.

Further, in the manufacturing method for a glass film according to the present invention, drive sources independent of each other may be provided to the upstream-side conveyor and the downstream-side conveyor, respectively.

As described above, when the drive sources independent of each other are provided to the upstream-side conveyor and the downstream-side conveyor, respectively, a conveying speed can be changed between before and after cutting of the glass film. Thus, fine adjustment in accordance with a cutting mode for the glass film can be achieved, thereby being capable of achieving further improvement of the cutting quality.

In this case, when the drive sources independent of each other are provided as described above, the drive sources may be adjusted so that the feeding speed of the downstream-side conveyor becomes higher than the feeding speed of the upstream-side conveyor with the manufacturing method for a glass film according to the present invention.

As described above, when the feeding speed of the downstream-side conveyor is set higher than the feeding speed of the upstream-side conveyor, a tensile force can be applied to the part of the glass film immediately before being cut. As a result, for example, the part of the glass film to be introduced into the cutting zones is stretched so that wrinkles which have been present until then can be eliminated. Alternatively, the glass film may be introduced into the cutting zones in the state of being stretched so as to prevent the formation of wrinkles. Thus, further improvement of the cutting quality can be achieved.

Further, the present invention can also provide a manufacturing method for a glass roll for obtaining a glass roll by rolling up the glass film manufactured by the manufacturing method described above. Further, in this case, a glass roll may be obtained by: drawing out the glass film from a glass roll of the glass film located on an upstream side of the upstream-side conveyor in the conveying direction and supplying the glass film to the cutting zones; and rolling up a glass film obtained by the cutting by a roll-up portion located on a downstream side of the downstream-side conveyor in the conveying direction into a roll shape to obtain the glass roll.

With the manufacturing method for a glass roll according to the present invention, an influence of vibration caused by driving the conveying device on the laser cutting of the glass film is prevented to thereby enable stable cutting of the glass film. Thus, when the glass film is supplied to the cutting zones by a roll-to-roll method as described above, and the glass film obtained by cutting is rolled up into a roll shape, a high-quality glass roll can be stably and efficiently provided.

Further, the above-mentioned object is also achieved by providing a manufacturing apparatus for a glass film according to the present invention. That is, there is provided a manufacturing apparatus for a glass film which involves cutting a strip-shaped glass film, the apparatus comprising: a conveying device capable of conveying the glass film in a predetermined direction; and a laser cutting device capable of cutting the glass film in predetermined cutting zones by irradiating the glass film being conveyed by the conveying device with laser beams, wherein a support conveyance surface of the conveying device for the glass film is separated at the cutting zones for the glass film so that the conveying device is separated into an upstream-side conveyor located on an upstream side of the cutting zones in a conveying direction for the glass film and a downstream-side conveyor located on a downstream side of the cutting zones in the conveying direction, and wherein the manufacturing apparatus further comprises a first surface plate disposed at a position that is located in a width direction of the glass film with respect to the cutting zones and corresponds to a center of a glass film obtained by the cutting in the width direction, the first surface plate being capable of supporting the glass film in a contact manner.

As described above, with the manufacturing method for a glass film according to the present invention, the support conveyance surface of the conveying device for the glass film is separated at the cutting zones for the glass film so that the conveying device is separated into the upstream-side conveyor located on the upstream side of the cutting zones in the conveying direction for the glass film and the downstream-side conveyor located on the downstream side of the cutting zones in the conveying direction. Thus, the part of the glass film passing through the cutting zones is prevented from being directly subjected to vibration or vertical movement from portions driven for support and conveyance, such as belts. Thus, an influence of, for example, the vibration on the cutting can be eliminated as much as possible, thereby being capable of achieving stable laser cutting. Further, in the present invention, the first surface plate capable of supporting the glass film obtained by the cutting in a contact manner at the center of the glass film in the width direction is provided at the same position as those of the cutting zones in the conveying direction. Thus, even in cutting zones for the glass film, the glass film being cut or the glass film obtained by cutting can be smoothly conveyed. As a result, the glass film can be cut in a stable state, and the glass film obtained by the cutting can be rolled up without causing misalignment. Accordingly, a high-quality glass film and a high-quality glass roll can be stably obtained.

Advantageous Effects of Invention

As described above, according to the present invention, an influence of driving of the conveying device on the laser cutting of the glass film is prevented to stably cut the glass film. As a result, a high-quality glass film can be stably provided.

BRIEF DESCRIPTION OF DRAWINGS

FIG. 3 is a sectional view of the conveying device taken along the cutting line A-A of FIG. 2.

DESCRIPTION OF EMBODIMENTS

Now, a manufacturing method for a glass film according to a first embodiment of the present invention is described with reference to FIG. 1 to FIG. 10.

Figure 1:
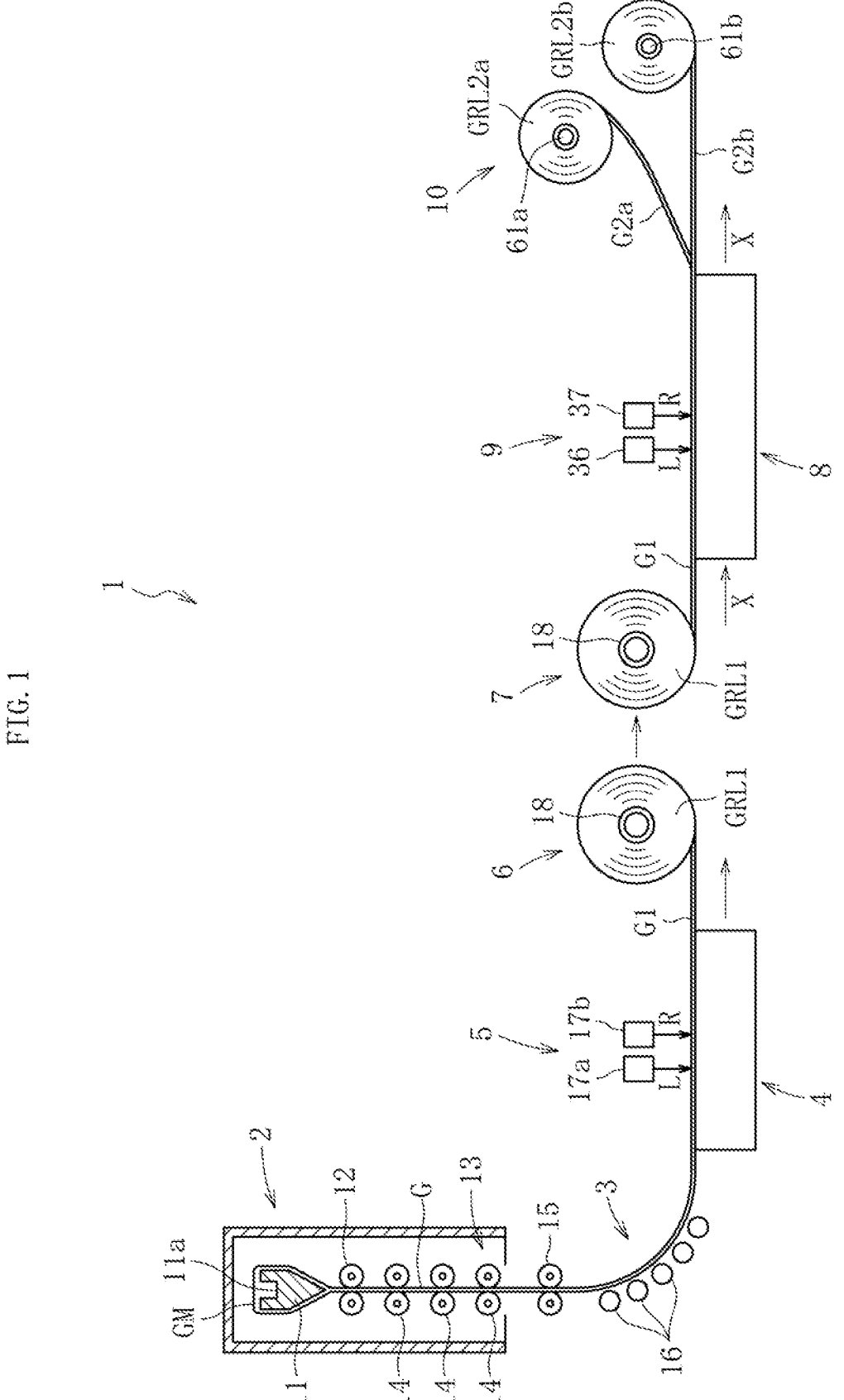
FIG. 1 is a side view for illustrating an overall configuration of a manufacturing apparatus for a glass film according to a first embodiment of the present invention.

As illustrated in FIG. 1, a manufacturing apparatus 1 for a glass film according to the first embodiment of the present invention comprises: a forming portion 2 configured to form a strip-shaped base glass film G; a direction conversion portion 3 configured to convert a traveling direction of the base glass film G from a vertically downward direction to a lateral direction; a first conveying portion 4 configured to convey the base glass film G in the lateral direction after the direction conversion; and a first cutting portion 5 configured to cut both end portions of the base glass film G in a width direction. In this embodiment, the manufacturing apparatus 1 further comprises a first roll-up portion 6 configured to roll up a glass film (hereinafter referred to as "first glass film") G1, which is obtained by removing the both end portions in the width direction of the base glass film G, into a roll shape to obtain a first glass roll GRL1. Thus, the manufacturing apparatus 1 may also serve as a manufacturing apparatus for a glass roll. In this embodiment, a longitudinal direction is a vertical direction, and a lateral direction is a horizontal direction.

Further, the manufacturing apparatus 1 for a glass film further comprises: a draw-out portion 7 configured to draw out the first glass film G1 from the first glass roll GRL1; a second conveying portion 8 configured to convey the first glass film G1, which has been drawn out from the draw-out portion 7, in the lateral direction; a second cutting portion 9 configured to cut part of the first glass film G1; and a second roll-up portion 10 configured to roll up a glass film (hereinafter referred to as "second glass film") G2, which is obtained through the cutting by the second cutting portion 9, into a roll shape to obtain second glass rolls GRL2a and GRL2b.

The first glass film G1 in this embodiment corresponds to a glass film before cutting according to the present invention, and the second glass film corresponds to a glass film obtained by cutting according to the present invention. Thus, the first glass roll GRL1 corresponds to a glass roll obtained by rolling up a glass film before cutting according to the present invention into a roll shape, and the second glass roll GRL2 corresponds to a glass roll obtained by rolling up a glass film obtained by cutting according to the present invention into a roll shape.

Further, the second roll-up portion 10 in this embodiment corresponds to a roll-up portion according to the present invention, the second cutting portion 9 corresponds to a laser cutting device according to the present invention, and the second conveying portion 8 corresponds to a conveying device according to the present invention.

The forming portion 2 comprises: a forming body 11 having a substantially wedge shape in sectional view in which an overflow groove 11a is formed on an upper end portion thereof; edge rollers 12 arranged immediately below the forming body 11 and configured to sandwich a molten glass GM overflowing from the forming body 11 from both front and back surface sides of the molten glass GM; and an annealer 13 arranged immediately below the edge rollers 12.

The forming portion 2 is configured to cause the molten glass GM overflowing from the overflow groove 11a of the forming body 11 to flow down along both side surfaces of the forming body 11 to be joined at a lower end portion of the forming body 11, to thereby form the molten glass GM into a film shape. The edge rollers 12 are configured to control shrinkage of the molten glass GM in a width direction to adjust the dimension in the width direction of the base glass film G. The annealer 13 is configured to perform strain removal treatment on the base glass film G. The annealer 13 comprises annealer rollers 14 arranged in a plurality of stages in a vertical direction.

Support rollers 15 configured to sandwich the base glass film G from both the front and back surface sides are arranged below the annealer 13. A tension for encouraging thinning of the base glass film G is applied between the support rollers 15 and the edge rollers 12 or between the support rollers 15 and the annealer rollers 14 at any one position.

The direction conversion portion 3 is arranged at a position below the support rollers 15. In the direction conversion portion 3, a plurality of guide rollers 16 configured to guide the base glass film G are arranged in a curved form. Those guide rollers 16 are configured to guide the base glass film G, which has been conveyed in the vertical direction, in the lateral direction.

The first conveying portion 4 is arranged in a forward traveling direction with respect to (on a downstream side of)

the direction conversion portion 3. When a driving portion having a support conveyance surface is driven, the first conveying portion 4 conveys the base glass film G, which has passed through the direction conversion portion 3, to a downstream side along a longitudinal direction of the base glass film G. The first conveying portion 4 may have a suitable configuration, and may include, for example, one or a plurality of belt conveyors. In this case, the driving portion having the support conveyance surface is a belt. The base glass film G can be conveyed in the above-mentioned mode by driving the belt. As a matter of course, a configuration of the first conveying portion 4 is not limited to that exemplified above. Other various types of conveying devices such as a roller conveyor may also be used.

The first cutting portion 5 is arranged above the first conveying portion 4. In this embodiment, the first cutting portion 5 is configured so as to be capable of cutting the base glass film G by laser cleavage. Specifically, the first cutting portion 5 comprises: a pair of laser irradiation devices 17a; and a pair of cooling devices 17b arranged on a downstream side of the laser irradiation devices 17a. The first cutting portion 5 is configured to, while the base glass film G is conveyed, heat a predetermined site of the base glass film G through irradiation with a laser beam L from the laser irradiation device 17a, and then release a refrigerant R from the cooling device 17b to cool the heated site.

The first roll-up portion 6 is arranged on a downstream side of the first conveying portion 4 and the first cutting portion 5. The first roll-up portion 6 is configured to roll up the first glass film G1 into a roll shape by rotating a winding core 18. The first glass roll GRL1 obtained as described above is conveyed to the position of the draw-out portion 7. The draw-out portion 7 is configured to draw out the first glass film G1 from the first glass roll GRL1 having been obtained by the first roll-up portion 6, and supply the first glass film G1 to the second conveying portion 8.

Figure 2:
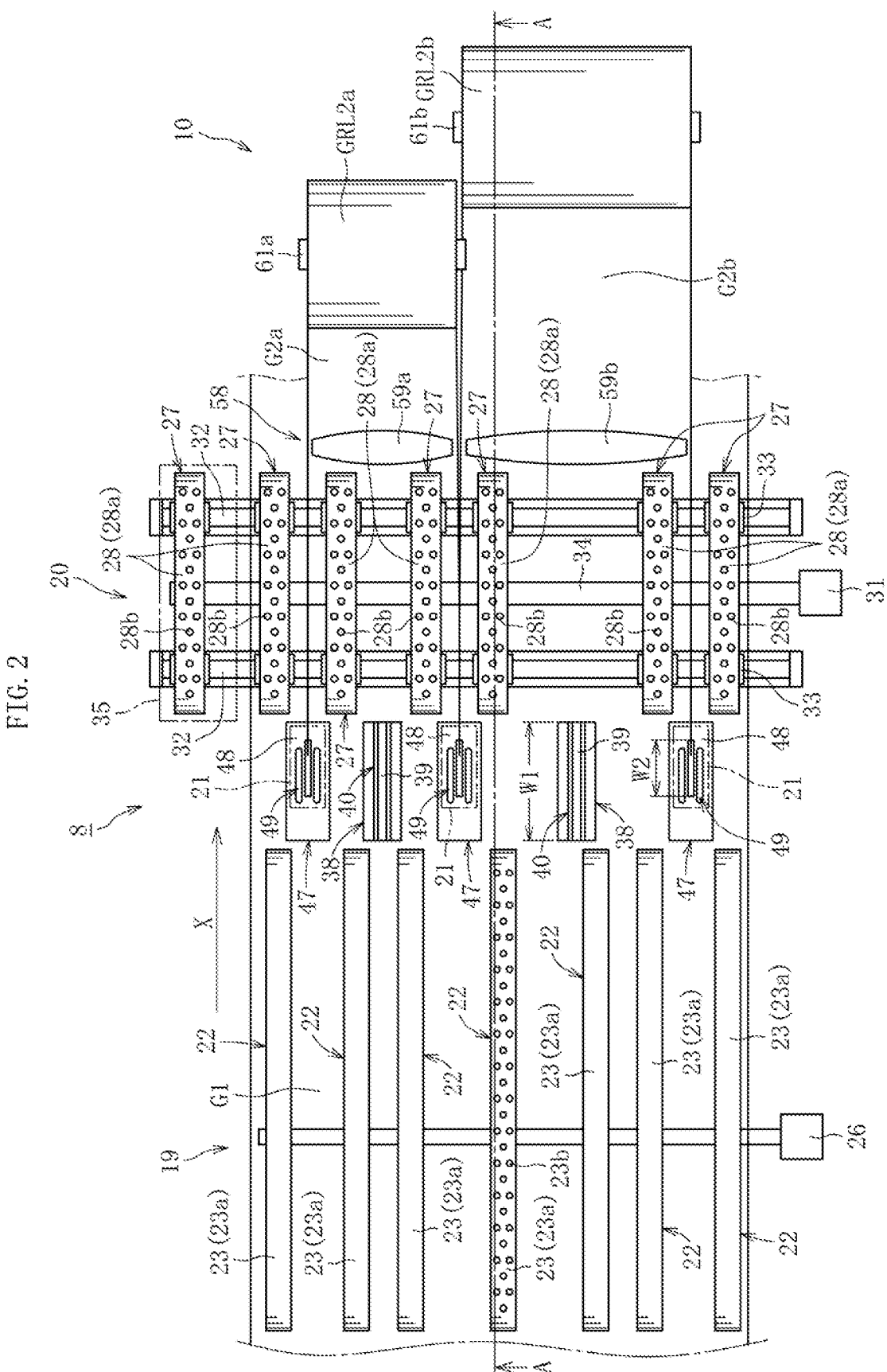
FIG. 2 is a plan view of a conveying device illustrated in FIG. 1.
Figure 3:
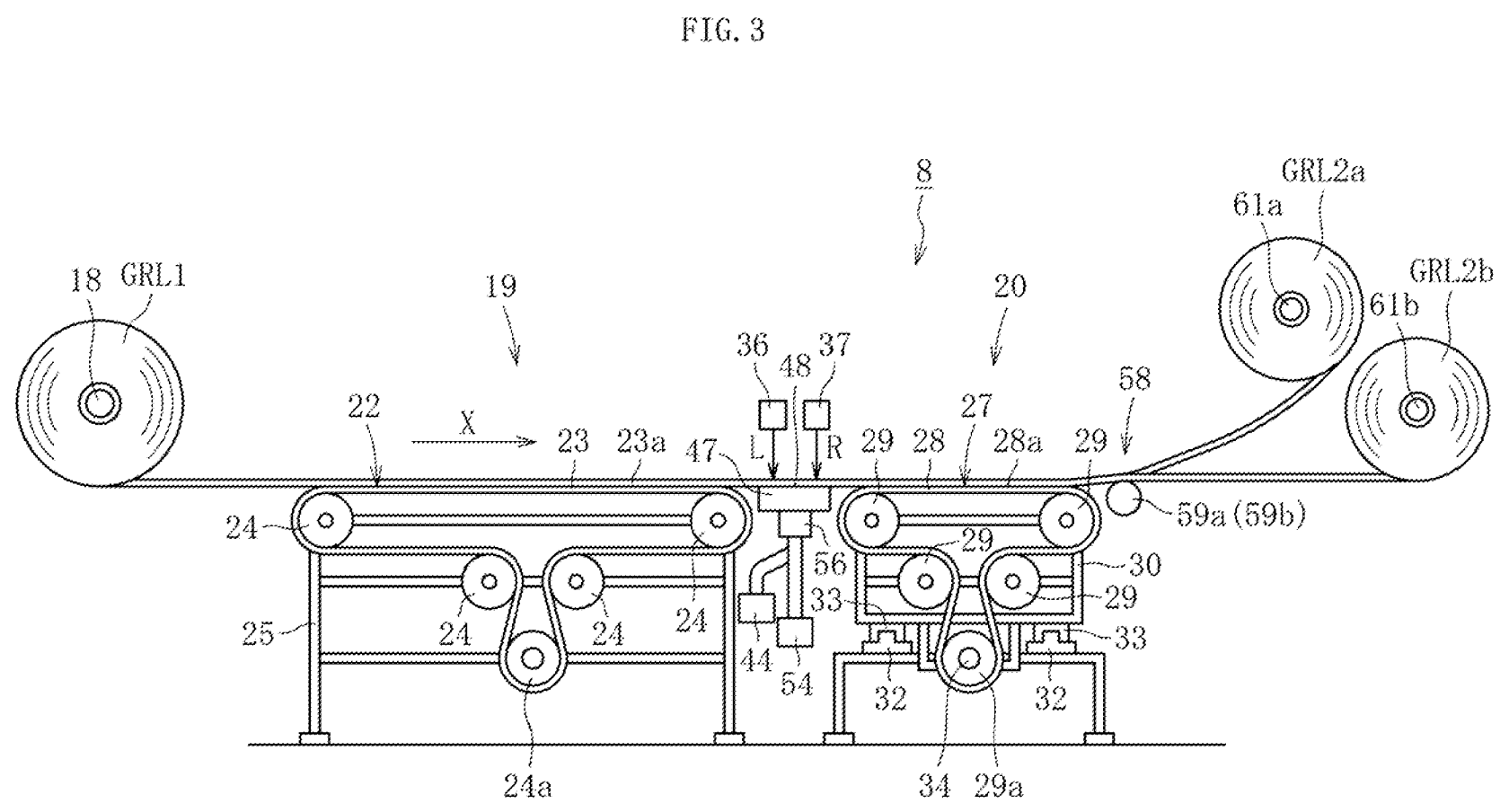

The second conveying portion 8 conveys the first glass film G1, which has been drawn out from the first glass roll GRL1 by the draw-out portion 7, in a lateral direction (hereinafter referred to as "conveying direction X"). Here, as illustrated in FIG. 2 and FIG. 3, the second conveying portion 8 comprises two conveyors 19 and 20. In this case, the support conveyance surfaces of the second conveying portion 8 are separated at cutting zones 21 (regions surrounded by one-dot chain lines in FIG. 2) where the first glass film G is cut by the second cutting portion 9. As a result, the second conveying portion 8 is separated into the upstream-side conveyor 19 and the downstream-side conveyor 20. The upstream-side conveyor 19 is located on an upstream side of the cutting zones 21 in the conveying direction for the first glass film G1. The downstream-side conveyor 20 is located on a downstream side of the cutting zones 21 in the conveying direction.

The upstream-side conveyor 19 of the two conveyors comprises a plurality of upstream-side belt conveyors 22. Each of the plurality of upstream-side belt conveyors 22 is configured to convey the first glass film G1 to a downstream side while supporting the first glass film G1 in a contact manner by a belt (hereinafter referred to as "first belt 23") in the same direction. Here, each of the first belts 23 is, for example, an endless strip-shaped belt. The first belts 23 are set at the same height positions so as to keep the first glass film G1 in a substantially horizontal posture over its entire region in the longitudinal direction in which the first belts 23 are in contact with the first glass film G1. This arrangement allows a surface 23a of each of the first belts 23, which serves as a support conveyance surface for the first glass film G1, to form a path line PL (see, for example, FIG. 5 referred to below) extending along the horizontal direction for the first glass film G1.

In this embodiment, as illustrated in FIG. 3, each of the upstream-side belt conveyors 22 comprises the first belt 23 having an endless strip shape described above, a plurality of pulleys 24, and a support member 25. The plurality of pulleys 24 allow the first belt 23 to be disposed in a predetermined position while applying tension to the first belt 23. The support member 25 supports the plurality of pulleys 24. The support member 25 is fixed onto a floor surface. Further, a drive source 26 such as a motor is coupled to a predetermined pulley 24 (drive pulley 24a) of the plurality of pulleys 24 (see FIG. 2). When a driving force is applied to the drive pulley 24a by the drive source 26, the first belt 23 of each of the upstream-side belt conveyors 22 can be driven in a predetermined direction.

Further, the plurality of upstream-side belt conveyors 22, each having the above-mentioned configuration, are installed at predetermined positions in the width direction. In this case, supposing that a plurality of kinds of first glass films G1 having different dimensions in the width direction are conveyed on the upstream-side conveyor 19, positions of the first belts 23 in the width direction are set so as to be able to support both ends of the first glass films G1, which are supposed to be conveyed, in the width direction in a contact manner. Further, in this embodiment, the upstream-side belt conveyors 22 are disposed so as to support all the first glass films G1 at center positions in the width direction in a contact manner independently of magnitudes of their dimensions in the width direction (see FIG. 2). At the same time, the upstream-side belt conveyor 22 is configured to attract the first glass film G1 onto the surface 23a of the first belt 23, which serves as the support conveyance surface of the upstream-side belt conveyor 22. In this embodiment, the surface 23a of the first belt 23 has a plurality of holes 23b. When air is taken through the holes 23b, the first glass film G1 can be attracted onto the surface 23a.

The downstream-side conveyor 20 comprises a plurality of downstream-side belt conveyors 27. Each of the plurality of downstream-side belt conveyors 27 is configured to convey the first glass film G1 obtained by cutting, that is, second glass films G2a and G2b, to a downstream side while supporting the first glass film G1 in a contact manner by a belt (hereinafter referred to as "second belt 28") in the same direction. In this case, each of the second belts 28 is, for example, an endless strip-shaped belt. The second belts 28 are set at the same height positions so as to keep the second glass films G2a and G2b in a substantially horizontal posture over its entire region in the longitudinal direction in which the second belts 28 are in contact with the second glass films G2a and G2b. This arrangement allows a surface 23a of each of the first belts 23, which serves as a support conveyance surface for the first glass film G1, and a surface 28a of each of the second belts 28, which serves as a support conveyance surface for the second glass films G2a and G2b, to form a path line PL extending in the horizontal direction for the first glass film G1 obtained before and after cutting, that is, a path line PL by the second conveying portion 8.

In this embodiment, as illustrated in FIG. 3, each of the downstream-side belt conveyors 27 comprises the second belt 28 having an endless strip shape described above, a plurality of pulleys 29, and a support member 30. The plurality of pulleys 29 allow the second belt 28 to be disposed in a predetermined position while applying tension to the second belt 28. The support member 30 supports the plurality of pulleys 29. Further, a drive source 31 such as a motor is coupled to a predetermined pulley 29 (drive pulley 29*a*) of the plurality of pulley 29 (see FIG. 2). When a driving force is applied to the drive pulley 29*a* by the drive source 31, the second belt 28 of each of the downstream-side belt conveyors 27 can be driven in a predetermined direction. The drive source 31 is provided separately from and independently of the drive source 26 for the upstream-side belt conveyors 22. The drive sources 26 and 31 can be controlled individually without being associated with each other, which in turn enables individual control of driving of the upstream-side belt conveyors 22 and the downstream-side belt conveyors 27.

Further, in this embodiment, the plurality of downstream-side belt conveyors 27 can be installed at predetermined positions in the width direction. At the same time, a position of each of the second belts 28 is adjustable in the width direction of the first glass film G1. More specifically, rail portions 32 extending in the width direction of the first glass film G1 are disposed below each of the downstream-side belt conveyors 27. Sliding portions 33 are mounted to a lower part of the support member 30 of each of the downstream-side belt conveyors 27. The sliding portions 33 are movable relative to the rail portions 32. As a result, when the sliding portions 33 mounted to each of the support members 30 slide in the width direction with respect to the rail portions 32, the plurality of pulleys 29 supported by each of the support members 30 and the second belt 28 supported by the pulleys 29 can slide together in the width direction. The drive pulley 29*a* of each of the downstream-side belt conveyors 27 is supported so as to be slidable in the width direction with respect to a shaft 34 common to the downstream-side belt conveyors 27. Thus, the drive pulley 29*a* can receive a driving force from the drive source 31 to be driven at a suitable position in the width direction while allowing a free change in its position in the width direction with respect to the shaft 34.

In this embodiment, as illustrated in FIG. 2, the positions of the second belts 28 (the downstream-side belt conveyors 27) in the width direction are adjusted so that one pair of second belts 28 are located in the vicinity of both ends of the second glass films G2*a* and G2*b* in the width direction. The second glass films G2*a* and G2*b* are obtained by cutting the first glass film G1. When two second glass films G2*a* and G2*b* are cut out of a single first glass film G1 while both end portions of the first glass film G1 in the width direction are cut off as in this embodiment, one of the downstream-side belt conveyors 27 is unneeded. Thus, it is preferred that, for example, the downstream-side belt conveyor 27 that is located on an outermost side in the width direction be moved into a retreat space 35. As a result, each of two second glass films G2*a* and G2*b* is supported and conveyed by two downstream-side belt conveyors 27 while interference of an unneeded one of the downstream-side belt conveyors 27 with the second glass films G2*a* and G2*b* is reliably avoided. At the same time, each of the end portions of the first glass film G1 in the width direction, which have been cut off, is supported and conveyed by one of the downstream-side belt conveyors 27. In this embodiment, as illustrated in FIG. 2, the second belts 28 of all the downstream-side belt conveyors 27 are configured to attract the second glass films G2*a* and G2*b* onto the surfaces 28*a*, which are support conveyance surfaces of the second belts 28. In this embodiment, the surface 28*a* of each of the second belts 28 has a plurality of holes 28*b*. When air is taken through the holes 28*b*, the second glass films G2*a* and G2*b* can be attracted onto the surfaces 28*a*.

The second cutting portion 9 is arranged above a region of the second conveying portion 8, which is located between the upstream-side conveyor 19 and the downstream-side conveyor 20 (see FIG. 1 and FIG. 3). In this embodiment, the second cutting portion 9 is configured to cut the first glass film G1 by laser cleavage. The second cutting portion 9 comprises a plurality of laser irradiation devices 36 and cooling devices 37. The cooling device 37 is arranged on a downstream side of each of the laser irradiation devices 36. In this case, the cooling devices 37 as many as the laser irradiation devices 36 are arranged. In this embodiment, three cutting zones 21 where the first glass film G1 is cut by the second cutting portion 9 are set in the width direction (see FIG. 2). Thus, three laser irradiations devices 36 and three cooling devices 37 are provided. The second cutting portion 9 having the above-mentioned configuration is configured to irradiate predetermined areas of the first glass film G1, which is being conveyed, with laser beams L emitted from the laser irradiation devices 36 to heat the predetermined areas and then discharge the refrigerant R from the cooling devices 37 to cool the heated areas. Details thereof are described later.

As illustrated in FIG. 2, first surface plates 38 are disposed at positions separate from the above-mentioned cutting zones 21 for the first glass film G1 in the width direction. The first surface plates 38 can support the first glass film G1, which is being conveyed by the second conveying portion 8, in a contact manner. More specifically, the first surface plates 38 are disposed at positions corresponding to centers of the first glass film G1 after cutting (the second glass films G2*a* and G2*b*) in the width direction. In this embodiment, two second glass films G2*a* and G2*b* are cut out of one first glass film G1. Thus, the first surface plates 38 are disposed at positions that are in the width direction with respect to the cutting zones 21 and correspond to centers of the second glass films G2*a* and G2*b* in the width direction. Although not shown, these first surface plates 38 are installed and fixed onto the floor surface, and are always in a stationary state.

Figure 4:
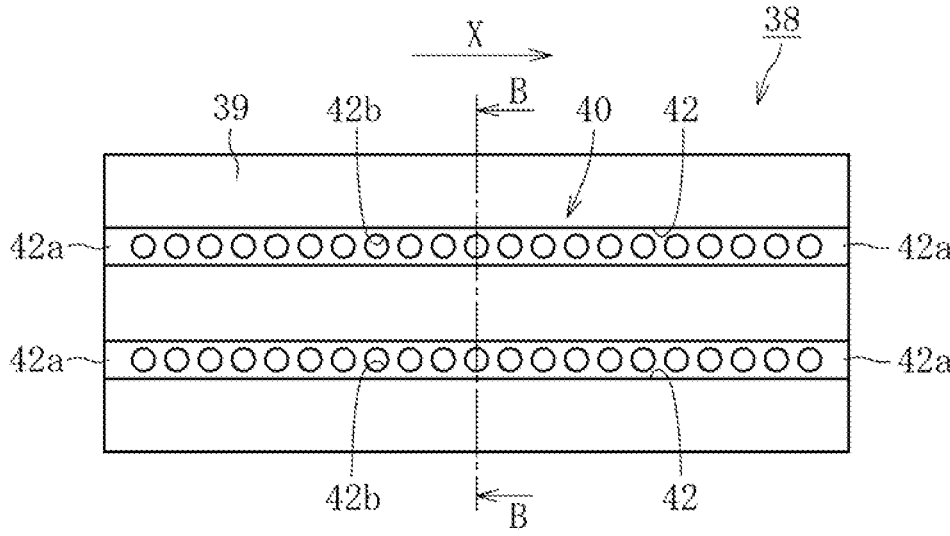
FIG. 4 is a plan view of a first surface plate illustrated in FIG. 2.

In this case, as illustrated in FIG. 4, each of the first surface plates 38 comprises a first support surface 39 and a first suction portion 40. The first support surface 39 can support the first glass film G1 in a contact manner. The first suction portion 40 can suck the first glass film G1 toward the first support surface 39.

Figure 5:
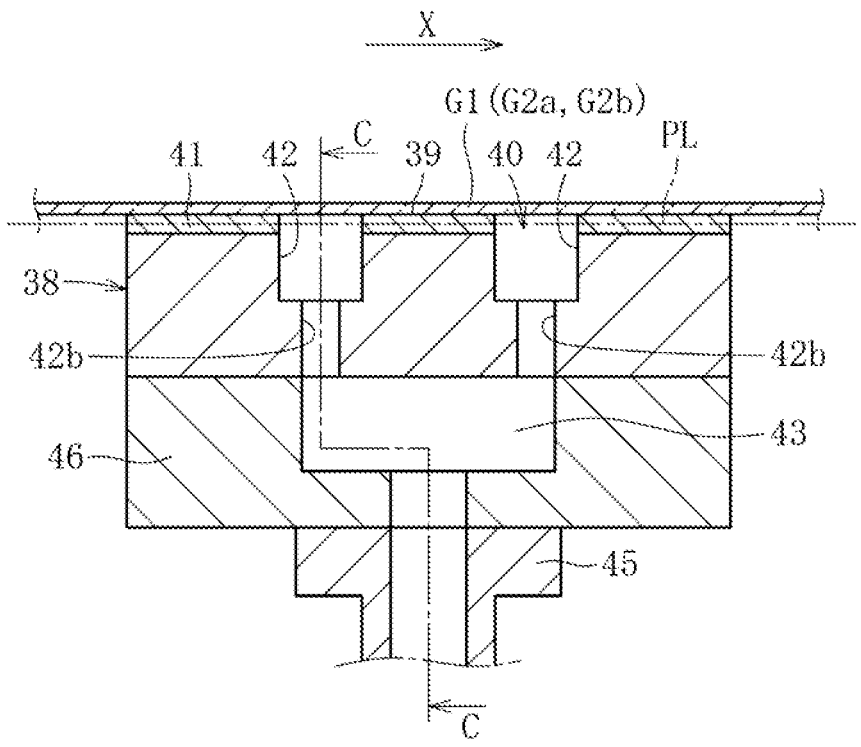
FIG. 5 is a sectional view of the first surface plate taken along the cutting line B-B of FIG. 4.

The first surface plate 38 is made of, for example, a metal, and has a substantially cuboidal shape. In this embodiment, as illustrated in FIG. 5, the first support surface 39 is a surface of a sheet member 41 provided on a top of the first surface plate 38. This sheet member 41 is made of a material having a small resistance when the sheet member 41 is brought into contact with the first glass film G1, for example, a resin, or a material having high slipperiness on the first glass film G1. The first support surface 39 is the surface of the sheet member 41 in this embodiment. However, as a matter of course, the first support surface 39 may be an upper surface of the first surface plate 38.

Figure 6:
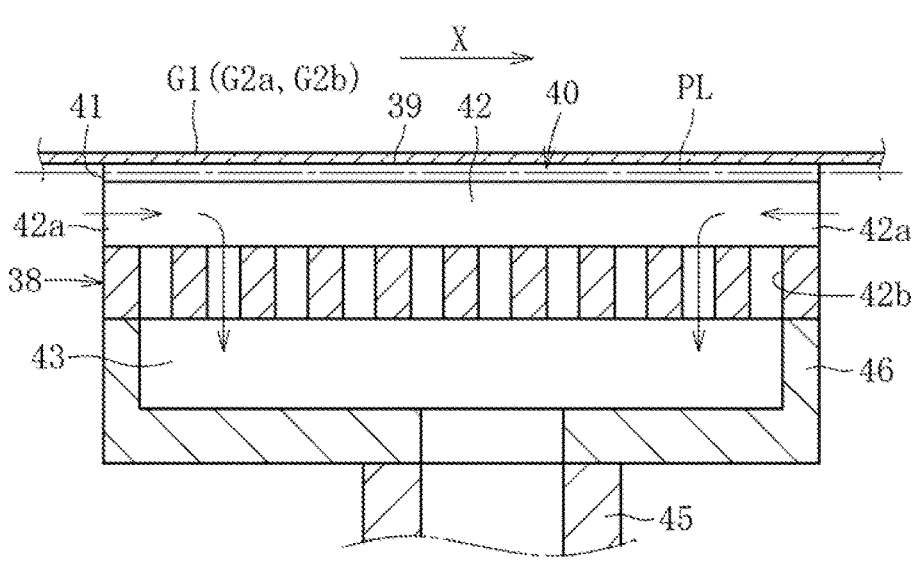
FIG. 6 is a sectional view of the first surface plate taken along the cutting line C-C of FIG. 5.

Further, a position of the first support surface 39 in the height direction may be the same as the position of the path line PL for the first glass film G1. However, as illustrated in FIG. 5 and FIG. 6, the position of the first support surface 39 in the height direction may be set slightly higher than the position of the path line PL (for example, by 3 mm or smaller). As a result, the first glass film G1 and the first support surface 39 can be more reliably brought into close contact with each other.

In this embodiment, the first suction portion 40 comprises first air intake ports 42, a communication space 43, an air-discharge portion, and a connection pipe 45 (see FIG. 5 for each). The first air intake ports 42 are open on the first support surface 39. The communication space 43 communicates with the first air intake ports 42. The air-discharge portion 44 is, for example, a pump, and discharges air from the communication space 43. The connection pipe 45 connects the communication space 43 and the air-discharge portion 44 to each other. In this embodiment, the first air intake ports 42 each have a groove-like shape. Further, the first air intake ports 42, each having a groove-like shape, are formed in the first support surface 39 so as to extend along a longitudinal direction of the first glass film G1, that is, the conveying direction (see FIG. 4). The first air intake ports 42 are formed so as to pass through the sheet member 41 and be open on an upper surface of the first surface plate 38. Further, in this embodiment, both ends of each of the first air intake ports 42 in the longitudinal direction are open on side surfaces of the first surface plate 38. Thus, both of end opening portions 42a, 42a of each of the first air intake ports 42 are always in a state of being exposed to an external space (outside air).

Each of the first air intake ports 42 has a bottom surface with a plurality of through holes 42b. The through holes 42b communicate with the communication space 43 formed in a support member 46 that supports the first surface plate 38. In this case, the first surface plate 38 has the through holes 42b, and the support member 46 has the communication space 43. The connection pipe 45 is mounted to the support member 46. For example, the air-discharge portion 44 may be shared by the connection pipes 45, and one air-discharge portion 44 may be connected to the connection pipes 45 as many as the first surface plates 38. Alternatively, the communication space 43 may be shared by the first surface plates 38, and a plurality of first surface plates 38 may be supported on one support member 46. In this case, one connection pipe 45 is mounted to one support member 46. The first suction portion 40 having the configuration described above takes air through the first air intake ports 42 being open on the first support surface 39 and both of the end opening portions 42a, 42a located at both ends in the longitudinal direction of each of the first air intake ports 42 by driving the air-discharge portion 44. Thus, when the glass film G1 is conveyed on the first support surfaces 39 of the first surface plates 38, a lower surface of the first glass film G1 is sucked toward the first support surfaces 39 through the above-mentioned air intake operation.

Further, in this embodiment, as illustrated in FIG. 2, second surface plates 47 are disposed so as to include the above-mentioned cutting zones 21 for the first glass film G1. The second surface plates 47 can support the first glass film G1 in a contact manner. In this embodiment, the first glass film G1 is cut at three positions in the width direction. Thus, three second surface plates 47 are disposed for three cutting zones 21, respectively. Although not shown, these second surface plates 47 are installed and fixed onto the floor surface, and are always in a stationary state.

Figure 7:
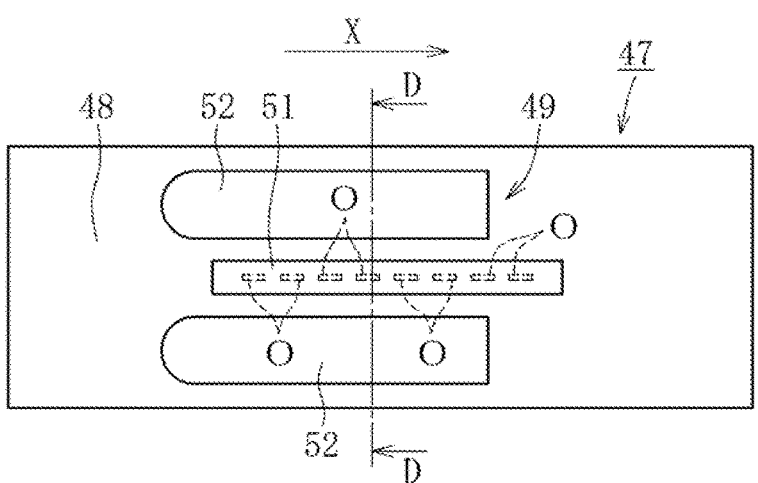
FIG. 7 is a plan view of a second surface plate illustrated in FIG. 2.

In this case, as illustrated in FIG. 7, each of the second surface plates 47 comprises a second support surface 48 and a second suction portion 49. The second support surface 48 can support the first glass film G1 in a contact manner. The second suction portion 49 can suck the first glass film G1 toward the second support surface 48.

Figure 8:
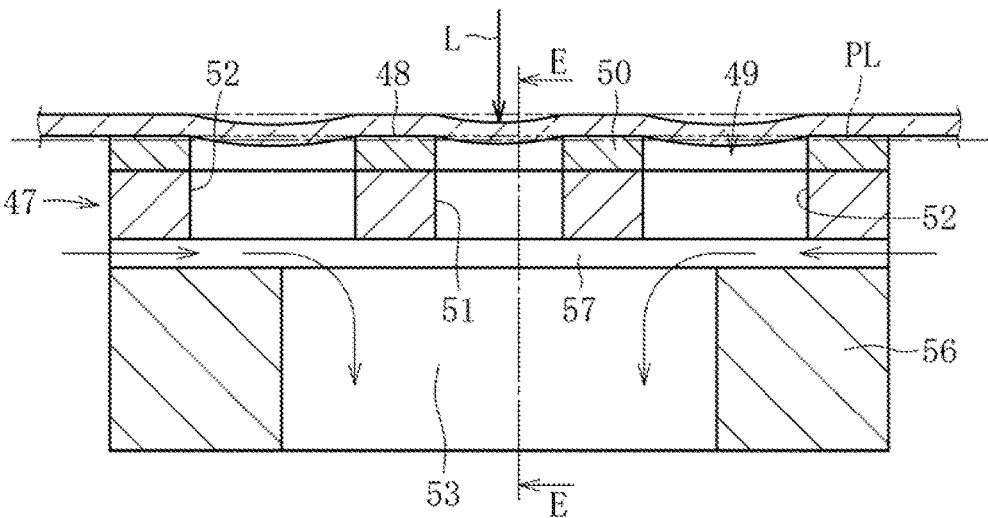
FIG. 8 is a sectional view of the second surface plate taken along the cutting line D-D of FIG. 7.

The second surface plate 47 is made of, for example, a metal, and has a substantially cuboidal shape. In this embodiment, as illustrated in FIG. 8, the second support surface 48 is a surface of a sheet member 50 provided on a top of the second surface plate 47. This sheet member 50 is made of a material having a small resistance when the sheet member 50 is brought into contact with the first glass film G1, for example, a resin, or a material having high slipperiness on the first glass film G1. The second support surface 48 is the surface of the sheet member 50 in this embodiment. However, as a matter of course, the second support surface 48 may be an upper surface of the second surface plate 47.

Figure 9:
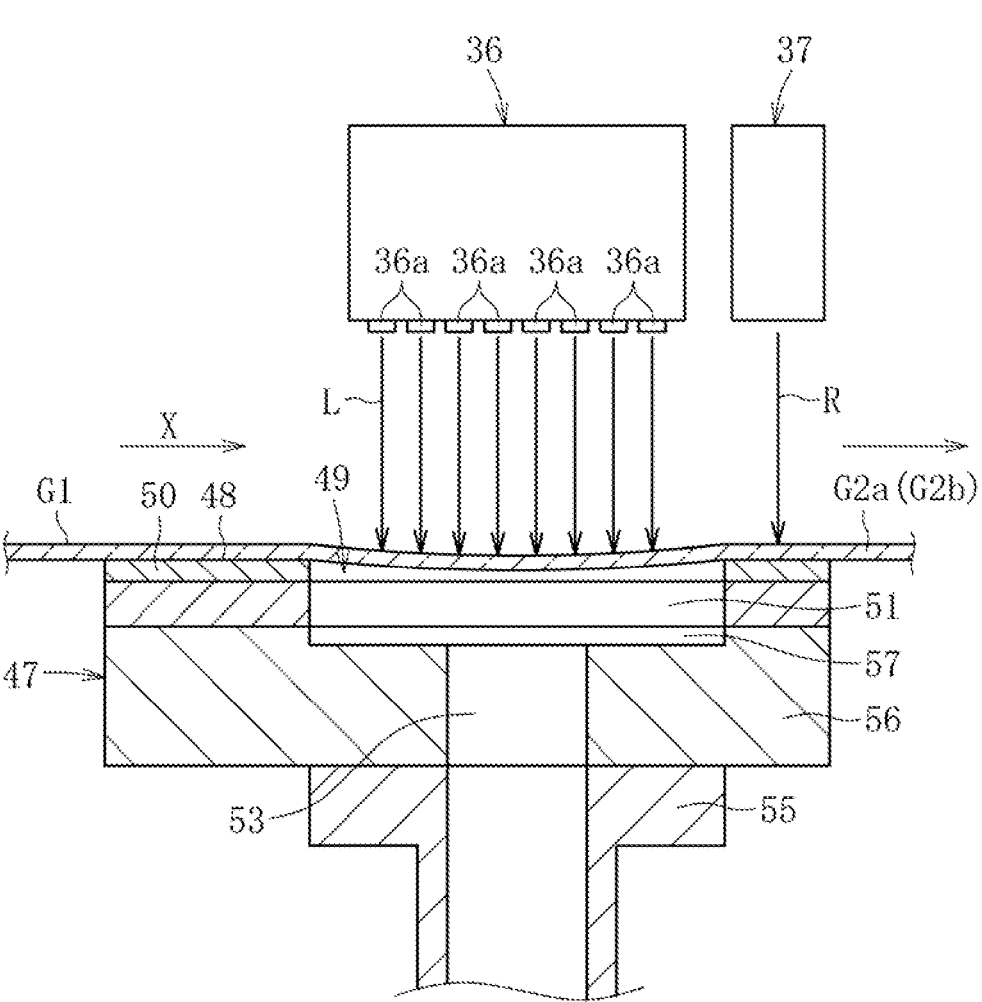
FIG. 9 is a sectional view of the second surface plate taken along the cutting line E-E of FIG. 8.

Further, a position of the second support surface 48 in the height direction may be the same as the position of the path line PL for the first glass film G1. However, as illustrated in FIG. 8 and FIG. 9, the position of the second support surface 48 in the height direction may be set slightly higher than the position of the path line PL (for example, by 3 mm or smaller). As a result, the first glass film G1 and the second support surface 48 can be more reliably brought into close contact with each other.

In this embodiment, the second suction portion 49 comprises second air intake ports 51, a pair of third air intake ports 52, 52, a communication space 53, an air-discharge portion, and a connection pipe 55. The second air intake ports 51 are open on the second support surface 48. The pair of third air intake ports 52, 52 are located on both sides in the width direction of the second air intake port 51. The communication space 53 communicates with the second air intake port 51 and the third air intake ports 52, 52. The air-discharge portion 54 is, for example, a pump, and discharges air from the communication space 53. The connection pipe 55 connects the communication space 53 and the air-discharge portion 54 to each other.

In this embodiment, each of the second air intake port 51 and the third air intake ports 52 are formed in the second support surface 48 so as to each have an elongated hole shape extending along the conveying direction X for the first glass film G1. In this case, dimensions of the second air intake port 51 in the width direction and the longitudinal direction are set to appropriate magnitudes in consideration of dimensions of each of the third air intake ports 52 in the width direction and the longitudinal direction. In other words, it is preferred that a magnitude relationship between the above-mentioned dimensions, in particular, various dimensions of the second air intake port 51 and various dimensions of each of the third air intake ports 52 be appropriately set in accordance with a required suction force (deformation force) for the first glass film G1.

The second air intake port 51 and the pair of third air intake ports 52, 52 having the above-mentioned configurations are formed through the sheet member 50 and the second surface plate 47. The second air intake port 51 and the third air intake ports 52, 52 are formed so as to pass through the sheet member 50 and the second surface plate 47 in the vertical direction, and communicate with the communication space 53 formed in a support member 56 that supports the second surface plate 47 on its lower side. In this case, the support member 56 has the communication space 53, and the connection pipe 55 is mounted to a lower side of the support member 56. For example, the air-discharge portion 54 may be shared by the second surface plates 47, and the connection pipes 55 as many as the second surface plates 47 may be connected to the air-discharge portion 54. Alternatively, the communication space 53 may be shared by the second surface plates 47, and a plurality of second surface plates 47 may be supported on one support member 56. In this case, one connection pipe 55 is mounted to one support member 56. Further, in this embodiment, a slit portion 57 is defined by the support member 56 and the second surface plate 47. The slit portion 57 is open in the width direction of the support member 56, and allows suction of outside air.

The second suction portion 49 having the configuration described above takes air through the second air intake port 51 and the third air intake ports 52, 52, which are open on the second support surface 48, and the slit portion 57 by driving the air-discharge portion 54. Thus, when the glass film G1 is conveyed on the second support surfaces 48 of the second surface plates 47, a lower surface of the first glass film G1 is sucked toward the second support surfaces 48 through the above-mentioned air intake operation.

Further, as in this embodiment, when the air-discharge portions 44 and 54, which are independent of each other, are provided to the first suction portion 40 and the second suction portion 49, respectively, suction forces can be individually controlled. For example, the suction forces of the first suction portion 40 and the second suction portion 49, in other word, air discharge amounts from the discharge ports 44 and 54 can be individually adjusted so that, for example, the suction force of the first suction portion 40 for the first glass film G1 becomes smaller than the suction force of the second suction portion 49. As a matter of course, the first suction portions 40 and the second suction portions 49 may share an air-discharge portion (not shown) so as to simplify the structure.

The laser irradiation devices 36 are each configured to radiate the laser beam L to a predetermined site of the first glass film G1 moving along the conveying direction X, to thereby locally heat the site. As illustrated in FIG. 9, the laser irradiation device 36 comprises a plurality of laser irradiation portions 36a. The laser irradiation portions 36a are arranged above the second air intake port 51 of the second plate surface 47. With this, the laser irradiation portions 36a are configured to radiate the laser beams L to a plurality of sites of the first glass film G1 passing through the second air intake port 51 open on the second support surface 48. Irradiation positions O with the laser beams L from the laser irradiation portions 36a are set so as to be located on a straight line substantially parallel to the conveying direction X of the first glass film G1.

The cooling devices 37 are arranged on a downstream side of the laser irradiation devices 36 in the conveying direction X of the first glass film G1. The cooling devices 37 are each configured to supply the refrigerant R toward the locally heated site of the first glass film G1, which is heated through irradiation of the laser beam L described above, to cool the site.

Figure 10:
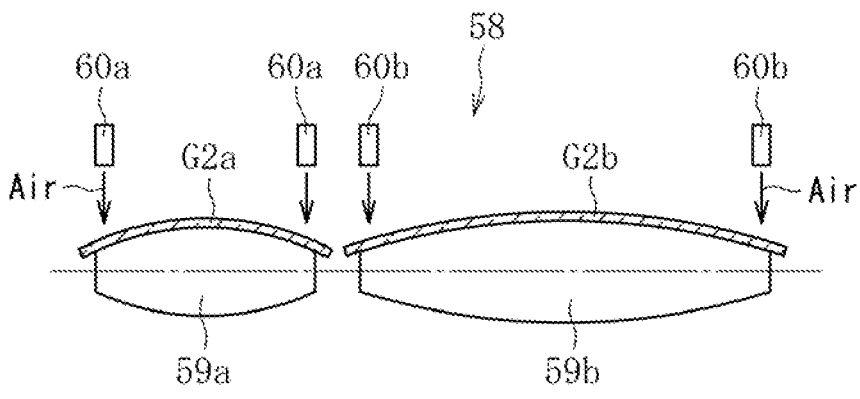
FIG. 10 is a conceptual view for illustrating actions of support rollers illustrated in FIG. 2.

A spacing portion 58 is provided on a downstream side of the second conveying portion 8. The spacing portion 58 spaces one set of the second glass films G2a and G2b apart from each other in the width direction. The second glass films G2a and G2b are adjacent to each other in the width direction. In this embodiment, the spacing portion 58 comprises support rollers 59a and 59b. The support rollers 59a and 59b each have a barrel-like shape with the largest diameter at a center in the width direction so that the second glass films G2a and G2b are deformed so as to curve in a direction of protruding upward and curved in an upwardly convex manner. In this embodiment, two second glass films G2a and G2b are obtained by cutting. Thus, two support rollers 59a and 59b are disposed. Further, in this embodiment, nozzles 60a and 60b are disposed, as illustrated in FIG. 10. The nozzles 60a and 60b spray gas such as air from above the second glass films G2a and G2b supported on the support rollers 59a and 59b toward both end portions thereof in the width direction, respectively.

The second roll-up portion 10 is disposed on a downstream side of the second conveying portion 8. More specifically, the second roll-up portion 10 rolls up the second glass films G2a and G2b conveyed by the second conveying portion 8 around winding cores 61a and 61b to thereby obtain the second glass rolls GRL2a and GRL2b. In this embodiment, two second glass films G2a and G2b are obtained by cutting. Thus, the two second glass rolls GRL2a and GRL2b are obtained by rolling up the two second glass films G2a and G2b, respectively.

As a material of the second glass films G2a and G2b (first glass film G1) to be manufactured by the manufacturing apparatus 1 having the above-mentioned configuration, silicate glass or silica glass is used. Borosilicate glass, soda-lime glass, aluminosilicate glass, or chemically tempered glass is preferably used, and alkali-free glass is most preferably used. The "alkali-free glass" as used herein refers to glass substantially free of an alkaline component (alkali metal oxide), and specifically refers to glass having a weight ratio of an alkaline component of 3,000 ppm or less. In the present invention, the weight ratio of the alkaline component is preferably 1,000 ppm or less, more preferably 500 ppm or less, most preferably 300 ppm or less.

In addition, the thickness dimensions of the second glass films G2a and G2b (in this embodiment, first glass film G1) are set to 10 μm or more and 300 μm or less, and is preferably 30 μm or more and 200 μm or less, most preferably 30 μm or more and 100 μm or less.

Now, a manufacturing method for the second glass films G2a and G2b (in this embodiment, second glass rolls GRL2a and GRL2b) through use of the manufacturing apparatus 1 having the above-mentioned configuration is described. This method comprises: a forming step S1; a both-end-portion removal step S2; a first roll-up step S3; a draw-out step S4; a cleavage step S5; and a second roll-up step S6.

In the forming step S1, as illustrated in FIG. 1, the molten glass GM overflowing from the overflow groove 11a of the forming body 11 in the forming portion 2 is caused to flow down along both side surfaces of the forming body 11 to be joined at a lower end of the forming body 11, to thereby form the molten glass GM into a film shape. At this time, the shrinkage of the molten glass GM in a width direction is controlled with the edge rollers 12, and thus the base glass film G having a predetermined width is formed. After that, strain removal treatment is performed on the base glass film G with the annealer 13 (annealing step). The base glass film G having a predetermined thickness is formed through a tension applied by the support rollers 15.

In the both-end-portion removal step S2, in the same manner as illustrated in FIG. 1, while the base glass film G is sent to a downstream side by the direction conversion portion 3 and the first conveying portion 4, part of the base glass film G is heated through irradiation with the laser beam L by the laser irradiation device 17a in the first cutting portion 5. After that, the refrigerant R is jetted to the heated site by the cooling device 17b. With this, a thermal stress is generated in the base glass film G. Initial cracks formed in the base glass film G in advance are developed through the thermal stress. With this, both end portions in the width direction are removed from the base glass film G. Thus, the first glass film G1 is formed.

In the subsequent first roll-up step S3, in the same manner as illustrated in FIG. 1, the first glass film G1 is rolled up around the winding core 18, to thereby form the first glass roll GRL1. After that, the first glass roll GRL1 is transferred to the draw-out portion 7. In the draw-out step S4, the first glass film G1 is drawn out from the first glass roll GRL1 having been transferred to the draw-out portion 7, and is conveyed to the second cutting portion 9 by the second conveying portion 8.

In the cutting step S5, the part of the first glass film G1 passing through the cutting zones 21 on the second conveying portion 8 is irradiated with laser beams L by the laser irradiation devices 36 in the cutting zones 21. In addition, the refrigerant R is sprayed onto irradiated areas to thereby cut the first glass film G1 in the direction along the conveying direction X. Further, at this time, the first glass film G1 is conveyed in the direction along the conveying direction X by the upstream-side conveyor 19, and passes on the first support surfaces 39 of the first surface plates 38 disposed at the positions separate from the cutting zones 21 in the width direction (see FIG. 2). In this case, when the air-discharge portions 44 of the first suction portions 40 are activated (are kept constantly activated), downward suction forces act on the first glass film G1 on the first support surfaces 39 through the first air intake ports 42 being open on the first support surfaces 39 to thereby suck the first glass film G1 toward the first support surfaces 39. As a result, the first glass film G1 is conveyed along the conveying direction X while being supported on the first support surfaces 39 in a contact manner. The sucked portions of the first glass film G1 may be deformed (for example, deformed so as to curve in a direction of protruding downward as illustrated in FIG. 8) depending on degrees of the suction forces of the first suction portions 40.

Further, in this embodiment, the second surface plates 47 are disposed so as to include the cutting zones 21. Thus, simultaneously with the passage of the first glass film G1 through the cutting zones 21 as described above, the first glass film G1 passes on the second support surfaces 48 of the second surface plates 47 (see FIG. 2). In this case, when the air-discharge portions 54 of the second suction portions 49 are activated (are constantly kept activated), downward suction forces act through the second air intake ports 51 and the pairs of third air intake ports 52, 52, which are open on the second support surfaces 48, on the first glass film G1 passing on the second support surfaces 48 to thereby suck the first glass film G1 toward the second support surfaces 48. As a result, the first glass film G1 is conveyed along the conveying direction X while being supported in a contact manner under a state in which the first glass film G1 is subjected to a force (restraining force) acting toward the second support surfaces 48. Further, the sucked portions of the first glass film G1 may be deformed (for example, as illustrated in FIG. 8, portions immediately above the air intake ports 51 and 52 may be deformed so as to curve in a direction of protruding downward) depending on degrees of the suction forces of the second suction portions 49.

In this case, a magnitude of the suction force of each of the first suction portions 40 is controlled appropriately by adjusting, for example, an output of the air-discharge portion 44 and shapes and sizes of the opening portions (first air intake port 42 and both of end opening portions 42a, 42a). Similarly, a magnitude of the suction force of each of the second suction portions 49 is controlled appropriately by adjusting, for example, an output of the air-discharge portion 54 and shapes and sizes of the opening portions (second air intake port 51, third air intake ports 52, and slit portion 57).

When the suction force is increased in the above-mentioned adjustment of the suction force, the above-mentioned deformation amount of the first glass film G1 increases. Meanwhile, a range of vertical movement of the first glass film G1 tends to narrow. In contrast, when the suction force is reduced, the above-mentioned deformation amount decreases. Meanwhile, the range of vertical movement tends to widen. Thus, it is preferred that the deformation amount be reduced as much as possible while the vertical movement falls within an allowable range.

In the cutting step S5, the first glass film G1 is conveyed by the second conveying portion 8 (upstream-side conveyor 19) while being sucked toward the first support surfaces 39 of the first surface plates 38 and the second support surfaces 48 of the second surface plates 47 as described above. At the same time, the first glass film G1 is irradiated with a plurality of laser beams L emitted from the laser irradiation portions 36a of the laser irradiation devices 36 (laser irradiation step). The laser beams L are radiated to areas of the first glass film G1, which are located over the second air intake ports 51 of the second surface plates 47 when the first glass film G1 passes thereover.

The above-mentioned irradiation with the laser beams L heats the first glass film G1 at irradiation positions O (see FIG. 7). After that, when the heated portions of the first glass film G1 reach positions immediately below the cooling device 37 located on the downstream side of the second air intake ports 51, the portions are exposed to the refrigerant R spayed downward from the cooling device 37 to be cooled. Expansion resulting from local heating performed by the laser irradiation device 36 and contraction resulting from cooling performed by the cooling device 37 cause thermal stress in the first glass film G1. The first glass film G1 has initial cracks formed in advance by means that is not shown. When the initial cracks are developed by making use of the above-mentioned thermal stress, the first glass film G1 are continuously cut (cleaved) at predetermined positions in the width direction. Further, in this embodiment, through the laser cutting at three positions in the width direction, both end portions of the first glass film G1 in the width direction are cut off, and two second glass films G2a and G2b, each having a predetermined dimension in the width direction, are obtained by cutting (see FIG. 2). The second glass films G2a and G2b are conveyed by the downstream-side conveyor 20 located on the downstream side of the cutting zones 21 in the conveying direction X toward the second roll-up portion 10 located on the downstream side of the downstream-side conveyor 20 in the conveying direction X.

In the second roll-up step S6, the second glass films G2a and G2b are rolled up around the winding cores 61a and 61b disposed at predetermined positions, respectively. After the second glass films G2a and G2b, each having a predetermined length, are rolled up, the second glass rolls GRL2a and GRL2b are obtained.

Further, in this embodiment, the support rollers 59a and 59b serving as the spacing portion 58 are disposed between the downstream-side conveyor 20 and the second roll-up portion 10. Thus, the second glass film G2 passing over the support rollers 59a and 59b is conveyed to the downstream side while being deformed (deformed so as to curve in a direction of protruding upward in this case) in conformity with outer peripheral surface shapes of the support rollers 59a and 59b. As a result, a predetermined gap in the width direction is defined by the second glass films G2a and G2b immediately after cutting (see FIG. 10). Thus, the second glass films G2a and G2b can be conveyed to the second roll-up portion 10 while preventing interference between their cut surfaces.

As described above, with a manufacturing method for a glass film (second glass films G2a and G2b) according to this embodiment, the support conveyance surfaces (surfaces 23a of the first belts 23 and surfaces 28a of the second belts 28) of the second conveying portion 8 for the first glass film G1 are separated at the cutting zones 21 for the first glass film G1 so that the second conveying portion 8 serving as a conveying device is separated into the upstream-side conveyor 19 located on the upstream side of the cutting zones 21 in the conveying direction X for the first glass film G1 and the downstream-side conveyor 20 located on the downstream side of the cutting zones 21 in the conveying direction X. Thus, the part of the first glass film G1 passing through the cutting zones 21 is prevented from being directly subjected to vibration or vertical movement from the portions such as the belts 23 and 28, which are driven to support and convey the first glass film G1, in the cutting zones 21. Thus, the influence of the vibration and other movement on the cutting is eliminated as much as possible, thereby being capable of achieving stable laser cutting. Further, with the manufacturing method according to this embodiment, the first surface plates 38 are provided at the same positions as those of the cutting zones 21 in the conveying direction. The first surface plates 38 can support the second glass films G2a and G2b, which are glass films obtained by cutting, in a contact manner at the centers of the second glass films G2a and G2b in the width direction. Thus, even in regions (cutting zones 21) of the second conveying portion 8 where the support conveyance surfaces are absent, the first glass film G1 or the second glass films G2a and G2b can be smoothly conveyed. Thus, the first glass film G1 can be cut in a stable state. Further, the second glass films G2a and G2b can be rolled up without causing misalignment. Accordingly, the high-quality second glass films G2a and G2b and the high-quality second glass rolls GRL2a and GRL2b can be stably obtained.

Further, in this embodiment, the first surface plate 38 comprises the first support surface 39 and the first suction portion 40. The first support surface 39 can support the second glass film G2a, G2b in a contact manner. The first suction portion 40 can suck the second glass film G2a, G2b toward the first support surface 39. With this configuration, the center of the second glass film G2a, G2b in the width direction is subjected to a suction force acting toward the first support surface 39. Thus, the suction force can act as a force, which counteracts a tensile force generated along with roll-up, on the part of the second glass film G2a, G2b passing through the cutting zones 21. This suction force can eliminate or reduce misalignment of the second glass film G2a, G2b. Thus, the second glass films G2a and G2b can be precisely cut to obtain the high-quality second glass films G2a and G2b and the high-quality second glass rolls GRL2a and GRL2b.

Further, in this embodiment, the second surface plate 47 having the second support surface 48 that can support the first glass film G1 in a contact manner is disposed so as to include the cutting zone 21. The second surface plate 47 comprises the second suction portion 49 that can suck the first glass film G1 toward the second support surface 48. In addition, the suction forces of the suction portions 40 and 49 are adjusted so that the suction force of the first suction portion 40 for the second glass film G2a, G2b becomes smaller than the suction force of the second suction portion 49 for the first glass film G1. The configuration described above relatively firmly restrains the first glass film G1 through the deformation of the laser-cut areas of the first glass film G1, which is caused along with the suction (see FIG. 8). Further, a sufficient restraining force, which counteracts the tensile force acting on each of the second glass films G2a and G2b along with the roll-up by the second roll-up portion 10 on the downstream side, can be applied to each of the second glass films G2a and G2b while smooth conveyance of the second glass films G2a and G2b as a whole is ensured.

Further, in this embodiment, the plurality of upstream-side belt conveyors 22 and the plurality of downstream-side belt conveyors 27, which are separated from each other at the cutting zones 21, have the drive sources 26 and 31 independent of each other, respectively. The plurality of upstream-side belt conveyors 22 form the upstream-side conveyor 19, and the plurality of downstream-side belt conveyors 27 form the downstream-side conveyor 20. Thus, the drive sources 26 and 31 can be adjusted so that a feeding speed of each of the downstream-side conveyors 27 becomes higher than a feeding speed of each of the upstream-side belt conveyors 22. When the feeding speeds of the belt conveyors 22 and 27 are set as described above, a tensile force acting in the direction along the conveying direction X can be applied to a part of the first glass film G1, which is to be cut shortly thereafter. As a result, for example, a part of the first glass film G1 to be introduced into the cutting zones 21 is stretched to eliminate wrinkles, which have been found immediately before the introduction of the first glass film G1 into the cutting zones 21. Alternatively, the first glass film G1 may be introduced into the cutting zones 21 while being stretched to prevent the formation of wrinkles. Thus, further improvement of cutting quality can be achieved.

The manufacturing method for a glass film and the manufacturing apparatus for a glass film according to the first embodiment of the present invention have been described. As a matter of course, the manufacturing method and the manufacturing apparatus may be modified in any suitable manner within the scope of the present invention.

Figure 11:
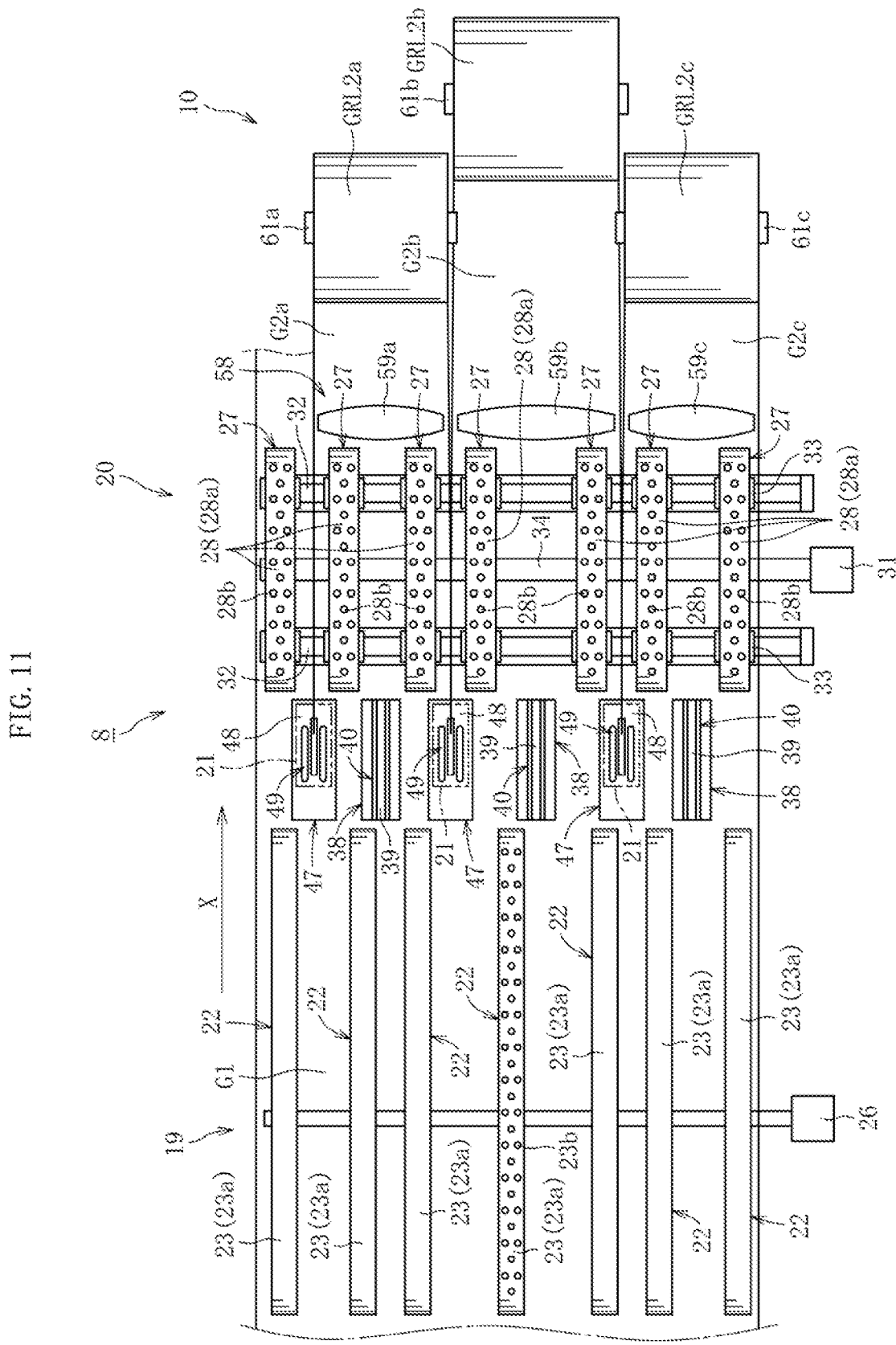
FIG. 11 is a plan view of a conveying device according to a second embodiment of the present invention.

FIG. 11 is a view for illustrating a manufacturing method for a glass film according to a second embodiment of the present invention. Specifically, in the first embodiment described above, there has been exemplified a configuration in which the present invention is applied to the cutting of two second glass films G2a and G2b out of one first glass film G1. In this embodiment, there is exemplified a configuration in which the present invention is applied to cutting of three second glass films G2a, G2b, and G2c out of one first glass film G1. Specifically, in this embodiment, in a manufacturing apparatus 1 illustrated in FIG. 11, the numbers and positions of first surface plates 38 and second surface plates 47 are adjusted in the width direction in accordance with positions and dimensions of second glass films G2a to G2c in the width direction, which are to be cut out. Further, the numbers and positions of laser irradiation devices 36 and cooling devices 37 in the width direction are adjusted in accordance with positions and dimensions of the second glass films G2a to G2c in the width direction. Specifically, although not shown, the laser irradiation device 36 and the cooling device 37 are arranged over each of the second surface plates 47 after positional adjustment.

Further, in this embodiment, positions of downstream-side belt conveyors 27 are adjusted in accordance with positions and dimensions of the second glass films G2a to G2c in the width direction. Specifically, as illustrated in FIG. 11, when the plurality of downstream-side belt conveyors 27 are configured to slide in the width direction along rail portions 32, the positions of the plurality of downstream-side belt conveyors 27 are adjusted in the width direction, for example, in accordance with positions of both ends of the second glass films G2a to G2c in the width direction.

When a spacing portion 58 is provided between a downstream-side conveyor 20 and a second roll-up portion 10, support rollers 59a to 59c, each having an appropriate dimension in the width direction, are arranged at appropriate positions in the width direction in accordance with the positions and dimensions of the second glass films G2a to G2c in the width direction, as illustrated in FIG. 11.

As described above, when the numbers of the first surface plates 38 and the second surface plates 47 and their positions in the width direction are adjusted, changes in cutting conditions for the first glass film G1, which are used in the manufacturing apparatus 1, can be flexibly dealt with. Further, when the positions of the downstream-side belt conveyors 27 are adjusted in the width direction in accordance with the positions and dimensions of the second glass films G2a to G2c in the width direction, the second glass film G2a to G2c can be supported and conveyed at equal positions in the width direction. Thus, a shift of second belts 28 to one side in the width direction to cause contact therebetween can be prevented so as to prevent unsatisfactory conveyance of the second glass films G2a to G2c, such as skew of the second glass films G2a to G2c caused by the shift of the contact position. Further, when the second glass films G2a to G2c are successfully conveyed without causing skew, interference of a cut surface (side end surface) of one second glass film G2a (G2c) of the second glass films adjacent to each other in the width direction with a cut surface (side end surface) of another second glass film G2b can be prevented as much as possible. Thus, the second glass films G2a to G2c and second glass rolls GRL2a to GRL2c, each having high cutting quality, can be obtained.

In the above-mentioned embodiment, there has been exemplified a case in which two (or three) second glass films G2a and G2b (G2a to G2c) are cut out of one first glass film G1. However, as a matter of course, the present invention is applicable to a case in which one second glass film G2a having a different dimension in the width direction is cut out. Further, the present invention is also applicable to a case in which four or more second glass films G2a and so on are cut out.

Figure 12:
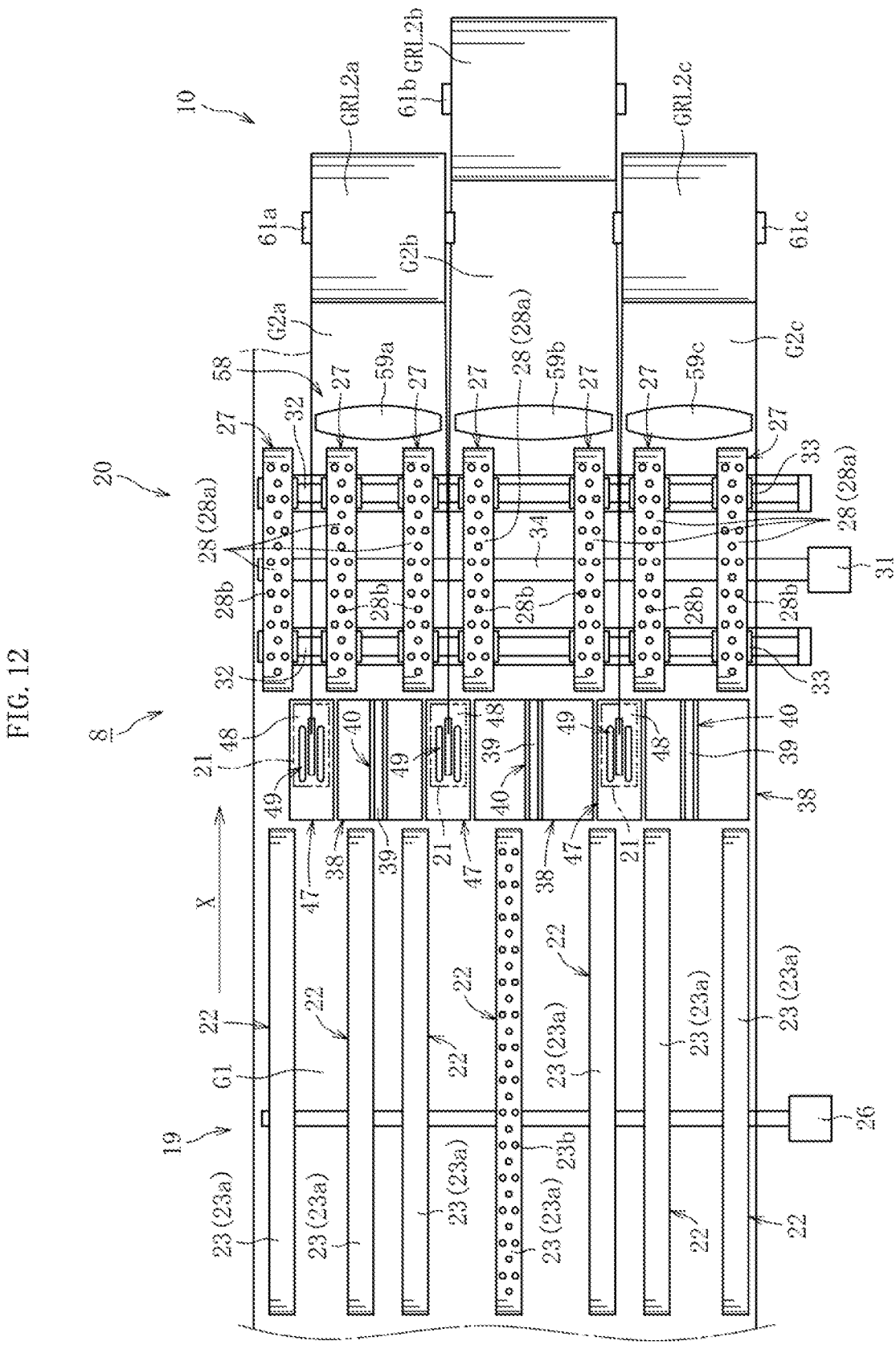
FIG. 12 is a plan view of a conveying device according to a third embodiment of the present invention.

Further, in the above-mentioned embodiments, there has been exemplified a case in which the first surface plate 38 is located at the same position and has the same dimension as the position and the dimension of the second surface plate 47 in the conveying direction X and is provided at a predetermined distance in the width direction from the second surface plate 47 adjacent thereto in the width direction. However, as a matter of course, the first surface plate 38 may have other shapes and arrangements. For example, as illustrated in FIG. 12, a first support surface 39 of the first surface plate 38 can be extended so as to substantially eliminate gaps from a pair of second surface plates 47, each being adjacent thereto in the width direction (extended to positions in proximity to the second surface plates 47). Further, although not shown, a dimension of the first surface plate 38 in the conveying direction X may be set larger than that of the second surface plate 47.

Further, in the above-mentioned embodiments, there has been exemplified a case in which each of the first air intake ports 42 formed in the first support surface 39 has a groove-like shape. However, as a matter of course, each of the first air intake ports 42 may have other shapes and forms. For example, although not shown, a plurality of through holes serving as the first air intake port 42 may be formed in the first support surface 39. Further, even when each of the first air intake ports 42 has a groove-like shape, for example, the first air intake port 42 may have a suitable shape other than that illustrated in the drawings, for example, a shape extending along the width direction. As a matter of course, each of the second air intake port 51 and the third air intake ports 52 (in particular, the third air intake ports 52 that do not correspond to an area irradiated with the laser beams L) formed in the second support surface 48 of the second surface plate 47 may have a shape other than that illustrated in the drawings.

There has been exemplified a case in which both of the upstream-side conveyer 19 and the downstream-side conveyor 20 obtained by dividing the second conveying portion 8 serving as the conveying device at the cutting zones 21 are belt conveyors. However, as a matter of course, the upstream-side conveyor 19 and the downstream-side conveyor 20 may have other shapes and forms. For example, at least one of the upstream-side conveyor 19 and the downstream-side conveyor 20 may be a roller conveyor or other various types of conveying devices.

There has been described a case in which not only the first surface plates 38 but also the second surface plates 47 are provided so as to include the cutting zones 21. However, the second surface plates 47 are not essential components. The second surface plates 47 may be omitted depending on a cutting mode for the first glass film G1. Alternatively, even when the second surface plates 47 are provided, the second suction portions 49 may be omitted.

Further, there has been described a case in which the present invention is used for the first glass film G1 obtained by cutting off both end portions of the base glass film G in the width direction with use of the first cutting portion 5. However, the present invention may be applicable to cutting of the base glass film G with use of the first cutting portion 5. In this case, the present invention can be carried out when the first conveying portion 4 has the same configuration as that of the second conveying portion 8 illustrated in FIG. 2 and other drawings.

There has been described a case in which the present invention is used for the first glass film G1 having a strip shape. However, as a matter of course, the present invention can also be used for the first glass film having other shapes. Specifically, the present invention is not limited to a manufacturing method for a glass roll. Thus, although not shown, the present invention is also applicable to manufacture of a glass sheet (glass film) having a sheet shape such as a rectangular shape. Such a glass sheet is manufactured by cutting out glass films, each having a predetermined length, of the glass film G1 with use of a width-direction cutting device in place of the second roll-up portion 10.

REFERENCE SIGNS LIST

1 manufacturing apparatus
2 forming portion
3 direction conversion portion
4 first conveying portion
5 first cutting portion
6 first roll-up portion
7 draw-out portion
8 second conveying portion
9 second cutting portion
10 second roll-up portion
11 forming body
17a laser irradiation device
17b cooling device
19 upstream-side conveyor
20 downstream-side conveyor
21 cutting zone
22 upstream-side belt conveyor
23, 28 belt

US 12,583,781 B2

23                                                          24

26, 31 drive source
27 downstream-side belt conveyor
32 rail portion
33 sliding portion
35 retreat space
36 laser irradiation device
37 cooling device
38 first surface plate
39 first support surface
40 first suction portion
41, 50 sheet member
42 first air intake port
42a, 42a both end opening portions
42b through hole
43, 53 communication space
44, 54 air-discharge portion
45, 55 connection pipe
46, 56 support member
47 second surface plate
48 second support surface
49 second suction portion
51 second air intake port
52 third air intake port
57 slit portion
58 spacing portion
59a, 59b, 59c support roller
60a, 60b nozzle
G base glass film
G1 first glass film
G2a, G2b, G2c second glass film
GM molten glass
GRL1 first glass roll
GRL2a, GRL2b, GRL2c second glass roll
L laser beam
PL path line
R refrigerant

The invention claimed is:

1. A manufacturing apparatus for a glass film which involves cutting a strip-shaped glass film to obtain the glass film, the manufacturing apparatus comprising:

a conveying device capable of conveying the strip-shaped glass film in a predetermined direction; and a laser cutting device capable of cutting the strip-shaped glass film in predetermined cutting zones by irradiating the strip-shaped glass film being conveyed by the conveying device with laser beams, wherein a support conveyance surface of the conveying device for the strip-shaped glass film is separated at the cutting zones for the strip-shaped glass film so that the conveying device is separated into an upstream-side belt conveyor including an upstream-side support conveyance surface located on an upstream side of the cutting zones in a conveying direction for the strip-shaped glass film and a downstream-side belt conveyor including a downstream-side support conveyance surface located on a downstream side of the cutting zones in the conveying direction, wherein the upstream-side support conveyance surface and the downstream-side support conveyance surface each move in the conveying direction, wherein a first surface plate capable of directly supporting the strip-shaped glass film in a contact manner is further disposed at a position that is located in a width direction of the strip-shaped glass film with respect to the cutting zones, overlaps the cutting zones in the conveying direction of the strip-shaped glass film, and corresponds to a center of the glass film obtained by the cutting of the strip-shaped glass film in the width direction, and wherein the support conveyance surface does not overlap the cutting zones in plan view.

2. A manufacturing method for a glass film, the manufacturing method comprising at least a cutting step of cutting a strip-shaped glass film to obtain the glass film while conveying the strip-shaped glass film in a predetermined direction by a conveying device, wherein, in the cutting step, the strip-shaped glass film is cut in predetermined cutting zones by irradiating the strip-shaped glass film with laser beams, wherein a support conveyance surface of the conveying device for the strip-shaped glass film is separated at the cutting zones for the strip-shaped glass film so that the conveying device is separated into an upstream-side belt conveyor including an upstream-side support conveyance surface located on an upstream side of the cutting zones in a conveying direction for the strip-shaped glass film and a downstream-side belt conveyor including a downstream-side support conveyance surface located on a downstream side of the cutting zones in the conveying direction, wherein the upstream-side support conveyance surface and the downstream-side support conveyance surface each move in the conveying direction, wherein a first surface plate capable of directly supporting the strip-shaped glass film in a contact manner is disposed at a position that is located in a width direction of the strip-shaped glass film with respect to the cutting zones, overlaps the cutting zones in the conveying direction of the strip-shaped glass film, and corresponds to a center of the glass film obtained by the cutting of the strip-shaped glass film in the width direction, and wherein the support conveyance surface does not overlap the cutting zones in plan view.

3. The manufacturing method for a glass film according to claim 2, wherein the first surface plate comprises a first support surface capable of directly supporting the strip-shaped glass film in a contact manner and a first suction portion capable of sucking the strip-shaped glass film toward the first support surface.

4. The manufacturing method for a glass film according to claim 3, wherein the first suction portion has a first air intake port having a groove shape, which is open on the first support surface and extends along the conveying direction.

5. The manufacturing method for a glass film according to claim 4, wherein the first air intake port has open ends on both sides in a longitudinal direction.

6. The manufacturing method for a glass film according to claim 3, wherein second surface plates each having a second support surface capable of supporting the strip-shaped glass film in a contact manner are disposed so as to each include one of the cutting zones, and each the second surface plates has a second suction portion capable of sucking the strip-shaped glass film toward the second support surface.

7. The manufacturing method for a glass film according to claim 2, wherein the first surface plate is stationary.

8. The manufacturing method for a glass film according to claim 2, wherein drive sources independent of each other are provided to the upstream-side belt conveyor and the downstream-side belt conveyor, respectively.

9. The manufacturing method for a glass film according to claim 8, wherein a feeding speed of the downstream-side belt conveyor is higher than a feeding speed of the upstream-side belt conveyor.

10. A manufacturing method for a glass roll, the manufacturing method comprising rolling up the glass film manufactured by the manufacturing method for a glass film of claim 1 into a glass roll.

11. The manufacturing method for a glass roll according to claim 10, further comprising drawing out the strip-shaped glass film from a glass roll of the strip-shaped glass film located on an upstream side of the upstream-side belt conveyor in the conveying direction and supplying the strip-shaped glass film to the cutting zones, wherein said rolling up of the glass film comprises rolling up the glass film obtained by the cutting by a roll-up portion located on a downstream side of the down-stream-side belt conveyor in the conveying direction into a roll shape to form the glass roll.

12. A manufacturing method for a glass film, the manufacturing method comprising at least a cutting step of cutting a strip-shaped glass film to obtain the glass film while conveying the strip-shaped glass film in a predetermined direction by a conveying device, wherein, in the cutting step, the strip-shaped glass film is cut in predetermined cutting zones by irradiating the strip-shaped glass film with laser beams, wherein a support conveyance surface of the conveying device for the strip-shaped glass film is separated at the cutting zones for the strip-shaped glass film so that the conveying device is separated into an upstream-side belt conveyor including an upstream-side support conveyance surface located on an upstream side of the cutting zones in a conveying direction for the strip-shaped glass film and a downstream-side belt conveyor including a downstream-side support conveyance surface located on a downstream side of the cutting zones in the conveying direction, wherein the upstream-side support conveyance surface and the downstream-side support conveyance surface each move in the conveying direction, wherein a first surface plate capable of directly supporting the strip-shaped glass film in a contact manner is disposed at a position that is located in a width direction of the strip-shaped glass film with respect to the cutting zones and corresponds to a center of the glass film obtained by the cutting of the strip-shaped glass film in the width direction, wherein the support conveyance surface does not overlap the cutting zones in plan view, wherein the first surface plate comprises a first support surface capable of directly supporting the strip-shaped glass film in a contact manner and a first suction portion capable of sucking the strip-shaped glass film toward the first support surface, wherein second surface plates each having a second support surface capable of supporting the strip-shaped glass film in a contact manner are disposed so as to each include one of the cutting zones, and each the second surface plates has a second suction portion capable of sucking the strip-shaped glass film toward the second support surface, and wherein each of the second suction portions has a second air intake port being open on the second support surface and a pair of third air intake ports located on both sides of the second air intake port in the width direction.

13. A manufacturing method for a glass film, the manufacturing method comprising at least a cutting step of cutting a strip-shaped glass film to obtain the glass film while conveying the strip-shaped glass film in a predetermined direction by a conveying device, wherein, in the cutting step, the strip-shaped glass film is cut in predetermined cutting zones by irradiating the strip-shaped glass film with laser beams, wherein a support conveyance surface of the conveying device for the strip-shaped glass film is separated at the cutting zones for the strip-shaped glass film so that the conveying device is separated into an upstream-side belt conveyor including an upstream-side support conveyance surface located on an upstream side of the cutting zones in a conveying direction for the strip-shaped glass film and a downstream-side belt conveyor including a downstream-side support conveyance surface located on a downstream side of the cutting zones in the conveying direction, wherein the upstream-side support conveyance surface and the downstream-side support conveyance surface each move in the conveying direction, wherein a first surface plate capable of directly supporting the strip-shaped glass film in a contact manner is disposed at a position that is located in a width direction of the strip-shaped glass film with respect to the cutting zones and corresponds to a center of the glass film obtained by the cutting of the strip-shaped glass film in the width direction, wherein the support conveyance surface does not overlap the cutting zones in plan view, wherein the first surface plate comprises a first support surface capable of directly supporting the strip-shaped glass film in a contact manner and a first suction portion capable of sucking the strip-shaped glass film toward the first support surface, wherein second surface plates each having a second support surface capable of supporting the strip-shaped glass film in a contact manner are disposed so as to each include one of the cutting zones, and each the second surface plates has a second suction portion capable of sucking the strip-shaped glass film toward the second support surface, and wherein a suction force of the first suction portion for the strip-shaped glass film is smaller than a suction force of the second suction portions for the strip-shaped glass film.

* * * * *